US011790468B1

(12) United States Patent
Bright et al.

(10) Patent No.: US 11,790,468 B1
(45) Date of Patent: Oct. 17, 2023

(54) ELECTRONIC DISPLAY DEVICE AND METHOD WITH USER INTERFACE FOR ACCREDITATION COMPLIANCE

(71) Applicant: Trajecsys Corporation, Cumberland, RI (US)

(72) Inventors: Brian S Bright, Hudson, NH (US); Charles J Martin, Mattapoisett, MA (US)

(73) Assignee: TRAJECSYS CORPORATION, Cumberland, RI (US)

( * ) Notice: Subject to any disclaimer, the term of this patent is extended or adjusted under 35 U.S.C. 154(b) by 0 days.

(21) Appl. No.: 17/935,554

(22) Filed: Sep. 26, 2022

(51) Int. Cl.
*G06F 3/048* (2013.01)
*G06Q 50/20* (2012.01)
*G06F 16/23* (2019.01)
*G06F 3/0484* (2022.01)
*G06F 3/0482* (2013.01)

(52) U.S. Cl.
CPC ......... *G06Q 50/205* (2013.01); *G06F 3/0482* (2013.01); *G06F 3/0484* (2013.01); *G06F 16/2379* (2019.01)

(58) Field of Classification Search
CPC . G09B 7/00; G09B 19/00; G09B 5/06; G06Q 50/20; G06Q 50/205; G06F 3/0482; G06F 3/0484
See application file for complete search history.

(56) References Cited

U.S. PATENT DOCUMENTS

| | | | |
|---|---|---|---|
| 7,885,943 B1* | 2/2011 | Yehuda | G06Q 10/10 707/754 |
| 8,265,968 B2 | 9/2012 | Yaskin et al. | |
| 8,632,340 B1* | 1/2014 | Schugren | G09B 5/00 434/350 |
| 8,641,425 B2* | 2/2014 | Chandler | G09B 7/02 434/323 |
| 8,651,873 B2* | 2/2014 | Steinberg | G09B 5/00 434/323 |
| 9,262,937 B2* | 2/2016 | Chandler | G09B 7/02 |
| 9,824,153 B1* | 11/2017 | Liang | G06F 16/248 |
| 10,878,359 B2 | 12/2020 | Watkins, Jr. | |
| 11,068,649 B2 | 7/2021 | Zertuche | |
| 2003/0050935 A1* | 3/2003 | Spetsmann | G09B 5/00 |
| 2004/0204971 A1* | 10/2004 | Graham | G06Q 10/06 700/100 |

(Continued)

OTHER PUBLICATIONS

Fahim Akhter et al., "Intelligent Accreditation System: A Survey of the Issues, Challenges, and Solution", (IJACSA) International Journal of Advanced Computer Science and Applications, vol. 7, No. 1, 2016.

*Primary Examiner* — Steven B Theriault
(74) *Attorney, Agent, or Firm* — Cybernetic Law PLLC; John Hocker

(57) ABSTRACT

Systems and methods include based on detecting of interaction with an item in a list of individual standards criterion required by a program, displaying an edit details sub screen corresponding to a single individual standards criterion associated with the item in the list, and when a user save interaction with the edit details sub screen is detected, transmitting, over a network to a server, any new user input entered into the user input field, and updating or adding, by the server, program standards information to a database.

20 Claims, 25 Drawing Sheets

(56) References Cited

U.S. PATENT DOCUMENTS

| | | | |
|---|---|---|---|
| 2006/0242004 A1* | 10/2006 | Yaskin | G06Q 30/0203 |
| | | | 705/7.38 |
| 2010/0047758 A1* | 2/2010 | McCurry | G09B 7/02 |
| | | | 434/353 |
| 2011/0070573 A1* | 3/2011 | Dennis | G09B 5/00 |
| | | | 434/433 |
| 2014/0120512 A1* | 5/2014 | Schugren | G09B 5/00 |
| | | | 434/350 |
| 2014/0188746 A1* | 7/2014 | Li | G06Q 50/205 |
| | | | 705/326 |
| 2014/0220535 A1* | 8/2014 | Angelone | G09B 5/00 |
| | | | 434/350 |
| 2015/0026081 A1* | 1/2015 | Colebank | G06Q 30/018 |
| | | | 705/317 |
| 2017/0124894 A1* | 5/2017 | Essafi | G09B 7/00 |
| 2020/0258093 A1* | 8/2020 | Shaw | G06F 21/57 |
| 2020/0302296 A1 | 9/2020 | Miller | |
| 2020/0335003 A1 | 10/2020 | Eckenstein et al. | |

\* cited by examiner

| Standard | Last Review Date | Faculty Assigned | Deadline | Review | Actions |
|---|---|---|---|---|---|
| 1.1: Core Values | 12/12/2020 | John Smith | 12/12/2021 | Approve | Edit | Delete |
| 1.2: Representation | 12/12/2020 | John Smith | 12/12/2021 | Approve | Edit | Delete |
| 1.3 Community Interest | 12/12/2020 | John Smith | 12/12/2021 | Approve ⚠ | Edit | Delete |
| 1.4 Partnerships | 12/12/2020 | John Smith | 12/12/2021 | Approve | Edit | Delete |
| 1.5 Administration | 12/12/2020 | John Smith | 12/12/2021 | Approve | Edit | Delete |

FIG. 6A

| Standard | Last Review Date | Faculty Assigned | Deadline | Review | Actions |
|---|---|---|---|---|---|
| 1.1: Core Values | 12/12/2020 | John Smith | 12/12/2021 | Approve 640A 👍 | Edit \| Delete |
| 1.2: Representation | 12/12/2020 | John Smith | 12/12/2021 | Approve 642A 🚩 | Edit \| Delete |
| 1.3 Community Interest | 12/12/2020 | John Smith | 12/12/2021 | Approve 640B 👍 | Edit \| Delete |
| 1.4 Partnerships | 12/12/2020 | John Smith | 12/12/2021 | Approve 640C 👍 | Edit \| Delete |
| 1.5 Administration | 12/12/2020 | John Smith | 12/12/2021 | Approve 642B 🚩 | Edit \| Delete |

FIG. 6B

ELECTRONIC DISPLAY DEVICE AND METHOD WITH USER INTERFACE FOR ACCREDITATION COMPLIANCE

BACKGROUND

1. Field

Embodiments relate generally to software display methods and systems for computer-implemented recordkeeping, data centralization and monitoring; education/school software; database and file access; application programming interfaces (APIs), project management planning; and graphical user interface (GUI) display navigation methods and systems, and more particularly are directed to real time user experience (UX) and GUIs navigating large volumes of data (e.g., Big Data) related to organizational standards compliance, accreditation, certification and/or verification.

2. Related Art

Patent Literature 1 (U.S. Pat. No. 9,824,153, filed Nov. 21, 2014; issued Nov. 21, 2017).

3. Description of the Related Art

Various software display methods have been proposed for facilitating proving a part of organizational (e.g., school, institutional or business) program standards compliance. As Patent Literature 1 notes, the process "for determining if an educational institution meets a set of standards is a manual process" and "so cumbersome that some schools have dedicated staff members responsible for leading what can be a multi-year process." Patent Literature 1 further notes that completing the standards assessments includes gathering curricular materials from multiple locations, which makes access and analyzation difficult, and results in high labor and opportunity costs. Because of the high labor and opportunity costs, as well as the significant human error (e.g., inadvertent human omission, misrepresentation, or misinterpretation) related to this time-consuming manual process, Patent Literature 1 discloses a system and method for importing classroom materials (e.g., tests) to determine whether the classroom ("curricular") materials meet or exceed organizational accreditation standards, and reporting the results.

However, Patent Literature 1 focuses on the classroom (faculty-student) relationship and analyzing the faculty curricular materials, such as quizzes, tests, or textbooks. Patent Literature 1 is limited (i.e., not comprehensive) with regards to third-party participants and other organizational standards data processing. For example, the reports in Patent Literature 1 omit important information in its analysis, such as third-party related "outside the classroom activities" (e.g., clinical student and supervisor activities). Patent Literature 1 does not incorporate a third-party participant that also participates in the program (e.g., anyone in an organizational standards program who may have feedback). Patent Literature 1 does not provide feedback forms for third-party participants. For the remaining portion of the accreditation process, the responsible party may use a spreadsheet software application (e.g., Microsoft Excel or Google Docs) to perform the hybrid human-machine data collection process, which includes a tremendous amount of human work (i.e., time-consuming human manual entry of student clinical data into a spreadsheet software application) to perform analysis for evaluating organizational standards compliance (a spreadsheet hybrid human-machine data entry approach). Thus, a large burden for preparing the data for organizational program standards compliance remains even after Patent Literature 1.

Due to the extremely laborious and lengthy protocols of such prior traditional manual and computer-assisted techniques, prior methods in this area have long suffered from the need of an efficient means of collecting and proving and/or assessing accreditation standards compliance. There are other shortcomings of the methods in the related art, as discussed below.

The above information is presented as background information only to assist with an understanding of the disclosure. No determination has been made, and no assertion is made, as to whether any of the above might be applicable as prior art regarding the disclosure.

SUMMARY

Aspects of the disclosure are to address at least the above-mentioned and below-mentioned problems and/or disadvantages and to provide at least the advantages described below.

As discussed similarly above, there is a need for networked electronic display devices with faster, more efficient display methods and customizable user interfaces for tracking and/or logging student activity related to enrollment in an organizational program having standards, tracking and/or logging relevant supervisor verification activity related to a supervising role in the program, and providing a user interface application that provides access to evaluation information, such as alerts and reports, based on the tracked information and any user updates/modifications to the organizational standards (e.g., changes to the criterion for evaluation). Such methods and interfaces may complement or replace conventional methods for displaying information within interfaces. Such methods and interfaces reduce the cognitive burden on a user and produce a more efficient human-machine interface. For battery-operated devices, such methods and interfaces conserve power and increase the time between battery charges by providing a more efficient human-machine interface. The interfaces also provide an automated method (e.g., with relation to a program accreditation process) compared to the conventional technology.

According to various embodiments, the present disclosure provides features and components to enhance the portability and user friendliness of a networked computer system that: (i) monitors and reports on a combination of student activity and supervisor activity (e.g., verification of the student activity), and (ii) provides a user experience, by way of navigation of display user interfaces, for accessing evaluation information (e.g., reviewing a current organizational status related to program standards, and/or generating reports, reminders and/or alerts related to the program standards in view of the school and supervisor activity), and (iii) updates criterion of a program standard (e.g., an accreditable program standard) based on user input.

According to various embodiments, the systems and methods allow organizations (e.g., programs and institutions) to better organize their data related to accreditation standards, as well as recognize events, and provide notifications of critical events in those standards, in a Big Data environment. For example, there may be 150+ program modalities in higher education and 7000 institutions that are accredited by all these different groups, which results in large volumes of data that a human cannot reasonably comprehend in an efficient manner. The recognition of events and/or trends (and generation of analytical reports/ summaries) is not something a human can do in a reasonable amount of time with, in this context, with this type of data processing (e.g., tens of thousands of transactions), as highlighted by Patent Literature 1. Moreover, this approach centralizes important pieces of documentation data and provides features that can be aggregated for a dean (or nurse administrator) against all related programs. This approach creates value for institution-level users, while also discouraging the all-problematic Excel spreadsheet hybrid human-machine data entry approach. According to various embodiments, a goal is to streamline data collection for accreditation, and to provide summary reporting, scheduling, and notifications regarding the various sites' accreditation standards and criterions (e.g., Big Data analysis and event detection). In addition, Patent Literature 1 is limited in regard to user interoperability, and in particular, does not provide a student or faculty GUI.

Accordingly, an aspect of the disclosure is to provide a real time computerized method including controlling a display coupled to an electronic computing device to display a program standards graphical user interface (GUI) that includes a populated list of individual standards criterion required by a program;

monitoring user interactions with the populated list of individual standards criterion that is displayed in the program standards GUI; while monitoring the user interactions with the populated list of individual standards criterion required by the program, detecting a user interaction with an individual item in the list of individual standards criterion required by the program; based on the detecting of the user interaction with the item in the list of individual standards criterion required by the program, causing the display to display an edit details sub screen corresponding to a single individual standards criterion associated with the item in the list, wherein the edit details sub screen includes a customizable user input field configured to receive a user input related to the single individual standards criterion associated with the item interacted with; and while the edit details sub screen is being displayed, performing the following operations: when a user save interaction with the edit details sub screen is detected, transmitting, over a network to a server, any new user input entered into the user input field, and updating or adding, by the server, program standards information to a database.

The real time server method may further comprise: tracking, and logging in a database, student activity related to enrollment in an organizational program having standards; causing a portion of the tracked student activity to be displayed by a supervisor electronic device; and tracking, and logging in a database, relevant supervisor verification activity related to a supervising role in the program, the relevant supervisor verification activity including a user interaction with the displayed portion of the tracked student activity.

According to an embodiment, the displayed program standards GUI includes a listing of one or more compliance standards associated with an accreditable program associated with a logged-in user, from among one or more accreditable programs stored in a database.

According to an embodiment, the displayed program standards GUI is a real time nested GUI that is automatically updated in real time, and that includes a nested architecture with a static region and a dynamic region, wherein the static region is displayed persistently, and the dynamic region changes based on interactions with the static region.

According to an embodiment, the static region includes a program standards menu with buttons that cause the dynamic region to change display screens when the buttons are interacted with.

According to an embodiment, the edit details sub screen displays a limited list of accreditable program criteria required by a respective accreditation agency, wherein an editable portion of the individual criterion compliance details summary is displayed while being editable by a user.

According to an embodiment, the real time server method further comprises: in response to the new user input being entered into the user input field, causing the user input to be displayed in the user input field, and the updating or adding, by the server, of the program standards information includes maintaining a centralized database by updating compliance data in the centralized database with the user input into the editable user input field.

According to an embodiment, the real time server method further comprises: in response to a user interaction corresponding to a report generation request, generating, based on data stored in the database, a report on standards of a program and stored student activity of students enrolled in the program and associated with a logged-in user and/or organization, and displaying or exporting the generated report information to maintain compliance with the standards of the program. According to an embodiment, the generated report information includes or is based on supervisor verified student activity, including time-dependent skill records (e.g., clinical timekeeping records verified by a supervisor, or to be verified by a supervisor).

According to an embodiment, a responsive server system is provided and comprises: a memory; and processing circuitry, wherein the processing circuitry is configured to executed computer-executable instructions stored in the memory to performing the real time server method described above, including the following operations: controlling a display coupled to an electronic computing device to display a program standards graphical user interface (GUI) that includes a populated list of individual standards criterion required by a program; monitoring user interactions with the populated list of individual standards criterion that is displayed in the program standards GUI; while monitoring the user interactions with the populated list of individual standards criterion required by the program, detecting a user interaction with an individual item in the list of individual standards criterion required by the program; based on the detecting of the user interaction with the item in the list of individual standards criterion required by the program, causing the display to display an edit details sub screen corresponding to a single individual standards criterion associated with the item in the list, wherein the edit details sub screen includes a customizable user input field configured to receive a user input related to the single individual standards criterion associated with the item interacted with; and while the edit details sub screen is being displayed, performing the following operations: when a user save interaction with the edit details sub screen is detected, transmitting, over a network to a server, any new user input entered into the user input field, and updating or adding, by the server, program standards information to a database.

According to an embodiment, a non-transitory computer-readable medium may be provided including computer-executable instructions that, when executed by processing circuitry, cause the processing circuitry to perform the real time server method including the following operations: controlling a display coupled to an electronic computing device to display a program standards graphical user interface (GUI) that includes a populated list of individual standards criterion required by a program; monitoring user interactions with the populated list of individual standards criterion that is displayed in the program standards GUI; while monitoring the user interactions with the populated list of individual standards criterion required by the program, detecting a user interaction with an individual item in the list of individual standards criterion required by the program; based on the detecting of the user interaction with the item in the list of individual standards criterion required by the program, causing the display to display an edit details sub screen corresponding to a single individual standards criterion associated with the item in the list, wherein the edit details sub screen includes a customizable user input field configured to receive a user input related to the single individual standards criterion associated with the item interacted with; and while the edit details sub screen is being displayed, performing the following operations: when a user save interaction with the edit details sub screen is detected, transmitting, over a network to a server, any new user input entered into the user input field, and updating or adding, by the server, program standards information to a database.

According to an embodiment, the real time server method may also include: displaying, on a display screen of an electronic computing device, a program selection screen (e.g., a first menu listing one or more accreditable programs (e.g., one or more programs associated with a logged-in accreditable organization)); in response to a user selection on the displayed first menu, displaying, on the display screen, a second menu listing one or more compliance standards associated with an accreditable program, from among the one or more accreditable programs, corresponding to the user selection on the displayed first menu; in response to a user selection on the displayed second menu, displaying, on the display screen, an individual criterion compliance details summary, wherein the individual criterion compliance details summary displays a limited list of accreditable program criteria required by a respective accreditation agency (or displays a limited list of data required by a respective accreditation agency), wherein an editable portion of the individual criterion compliance details summary is displayed while being editable by a user; and in response to a user input into the editable portion of the displayed compliance details summary, displaying, on the display screen, the user input into the editable portion, and maintaining a centralized database by updating compliance data in the centralized database with the user input into the editable portion.

According to an embodiment, the real time server method may also include: extracting, from the centralized database, information related to the criterion that is associated with the accreditable program and a logged-in user, and displaying, on the display screen, the information related to the criterion. According to an embodiment, the displayed information related to the criterion is an actual score. According to an embodiment, the editable portion is a text box, and the real time server method further includes displaying a text portion prompting the user to enter an Expected Level of Achievement in the editable portion.

According to an embodiment, the first menu displays a name column, a Last Review Date column, a Faculty Assigned Column, a Deadline Column, a Review Column, and an Actions Column. According to an embodiment, the user selection on the displayed second screen includes a user selection of a name of a criterion. According to an embodiment, the second (edit/details) menu displays one or more of or all of: the name of the criterion that was selected, a description of the criterion, an Expected Level of Achievement (ELA) editable portion, a Last Reviewed Date editable portion, a Review Deadline, a Faculty Assigned to Review, a Send Notification Checkbox, a Days Before Deadline box, an Additional Notification Recipients (Comma-Delimited Emails) checkbox, a field for comma-delimited emails, a Notes box, a quantitative/qualitative toggle field, an Actual Result of the ELA, an Expected Result of the ELA, a Last Reviewed By, and a Last Reviewed On, a Save Button and a Cancel Button.

According to an embodiment, the updating the compliance data includes updating, in the centralized database, compliance data of a school or organizational site associated with a logged-in user. According to an embodiment, the real time server method may also include: prior to displaying the second menu, identifying the respective accreditation agency based on accreditation agency information stored in the centralized database in association with the one or more accreditable programs. According to an embodiment, the real time server method may also include: based on a user request, importing standards and criterion based on the national accrediting agency and their national accrediting body. In other embodiments, the standards compliance information (individual standards criterion) may be entered using the program standards GUIs described below.

According to an embodiment, a real time server method may include displaying, on a display screen of an electronic computing device, a menu listing one or more compliance standards associated with one or more accreditable programs; displaying, on a display screen of an electronic computing device, an individual criterion compliance details summary, wherein the individual criterion compliance details summary displays a limited list of accreditable program criteria required by a respective accreditation agency, wherein an editable portion of the individual criterion compliance details summary is displayed while being editable by a user; and in response to a user input into the editable portion of the displayed individual criterion compliance details summary, displaying, on the display screen, the user input into the editable portion, and maintaining a centralized database by updating compliance data in the centralized database with the user input into the editable portion.

According to an embodiment, the real time server method may handle the following scenario: a user logins into the responsive server system, the user will select SPE from the menu, the user will import standards and criterion based on the accreditors and their national accrediting body, the user will enter the expected level of achievement (ELA), for each criterion, the user will enter the faculty name that is assigned to the criterion and will select a date (using the calendar) that it is due for review, the faculty will receive an email notification, the user will select if the data will be qualitative or quantitative, and the data can be exported and saved, or printed, to provide to accreditors during accreditation visits. For example, in the case of the accreditation/reaccreditation process, an accrediting body's decision relies heavily on reports by the schools themselves. These reports may present the results of the school's analysis of data, but may not make the data itself readily available for audit. The GUIs described herein provide an automated method (e.g., with relation to a program accreditation process) compared to the conventional technology.

The present disclosure further provides additional features related to program standards assessment.

BRIEF DESCRIPTION OF DRAWINGS

The above and other aspects, features, and advantages of certain embodiments of the disclosure will be more apparent from the following description taken in conjunction with the accompanying drawings, in which:

FIG. 6A illustrates a standards status table, according to certain embodiments;

FIG. 6B illustrates a standards status table with real time alerts, according to an embodiment;

Throughout the drawings, it should be noted that like reference numbers are used to depict the same or similar elements, features, and structures.

DETAILED DESCRIPTION OF THE INVENTION

Figure 1A:
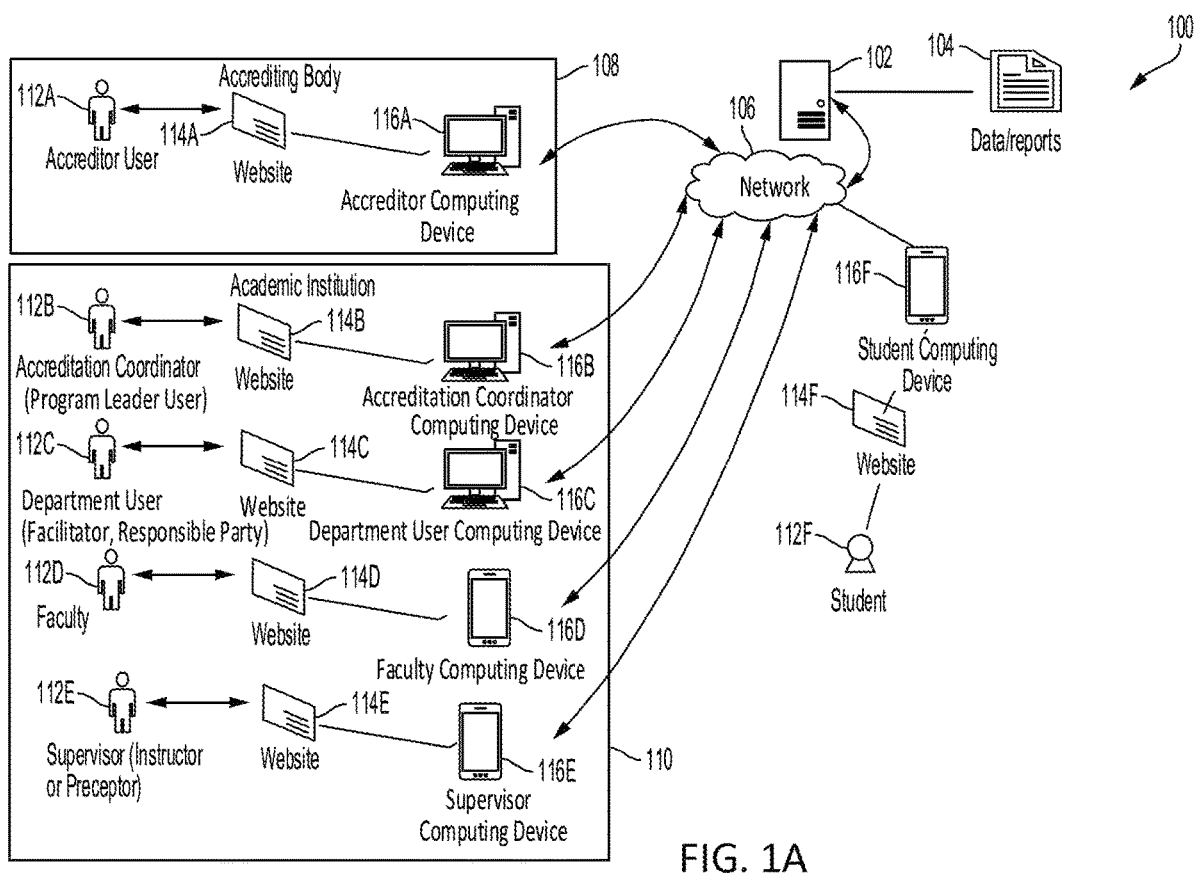
FIG. 1A illustrates a diagram of a networked computer system that may execute a method, according to an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. The terminology used herein is for the purpose of referring to specific embodiments only, and is not intended to limit the invention.

The terms and words used in the following description and claims are not limited to the bibliographical meanings, but are merely used by the inventor(s) to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents. Unless defined otherwise, all terms including technical and scientific terms used herein have the same meaning as commonly understood by those of ordinary skill in the art to which the present invention belongs. Commonly used terms defined in a dictionary are additionally interpreted as having a meaning consistent with the related technical literature and the presently disclosed content, and unless defined, are not interpreted in an ideal or very formal meaning.

As used herein, the singular forms "a," "an," and "the" include the plural forms unless the context clearly indicates otherwise. Thus, for example, reference to "an element" includes reference to one or more of such elements. The meaning of "comprising," as used herein, specifies a particular characteristic, region, integer, step, operation, element and/or component, and other specific characteristic, region, integer, step, operation, element, component, and/or group. It does not exclude the existence or addition of anything.

With reference to the accompanying drawings, the embodiments of the disclosure will be described in detail so that those of ordinary skill in the art can easily carry out the embodiments. However, the inventive concepts may be embodied in several different forms and is not limited to the embodiments described herein.

According to various embodiments, the present disclosure provides features and components to enhance the portability and user friendliness of a networked computer system to: (i) monitor and report on a combination of student activity and supervisor verification of the student activity, and (ii) provide a user experience, by way of navigation of display user interfaces, for accessing evaluation information (e.g., reviewing a current organizational status related to program standards, and/or generating reports, reminders and/or alerts related to the program standards in view of the school and supervisor activity), and (iii) updating criterion of a program standard (e.g., an accreditable program standard) based on user input.

Networked Computer System

FIG. 1A illustrates a diagram of a networked computer system 100 that may execute a method, according to an embodiment. The networked computer system 100 may include a server 102 and one or a plurality of user devices or terminals (e.g., user computing devices 116A-116F). The computing devices 116A-116F, which may be referred to as user terminals, may be communicably connected via a network 106 (e.g., the Internet) to communicate with the responsive server 102. The user computing devices 116A-116F may each correspond to an electronic computing device 150 described in FIG. 1B, and the server may correspond to the server 180 described in FIG. 1C.

Figure 1B:
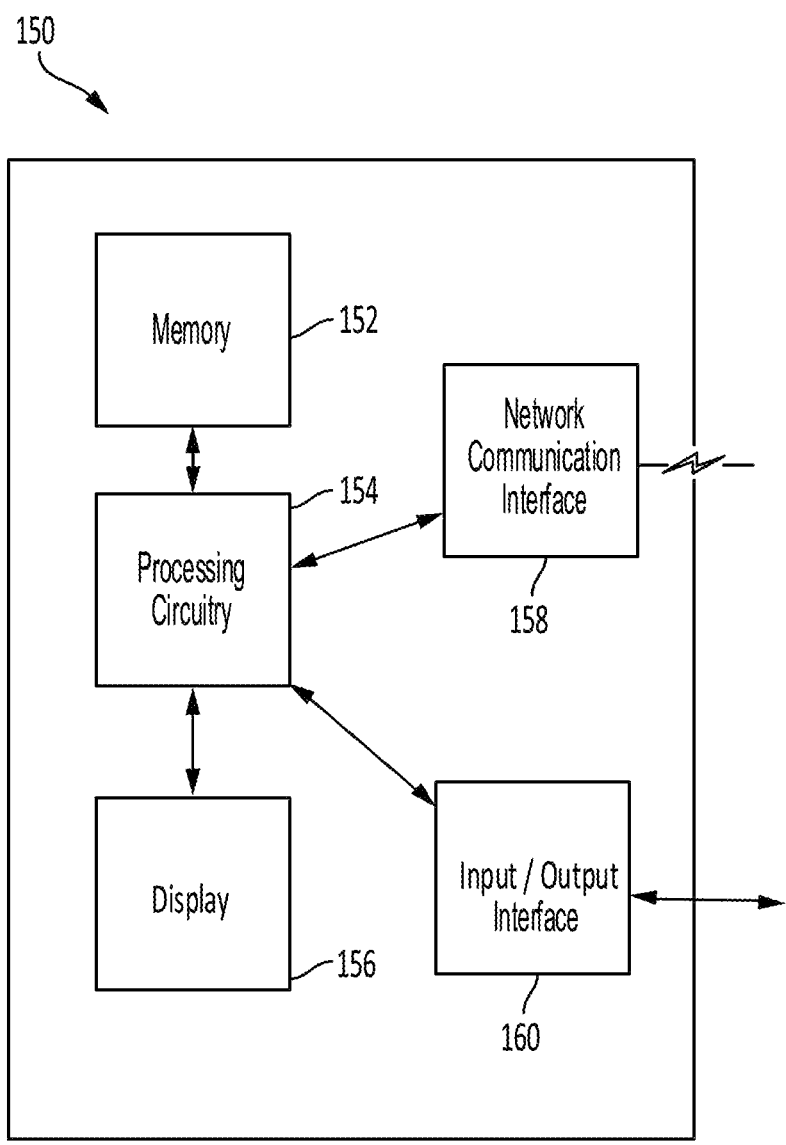
FIG. 1B illustrates a detailed view of an electronic computing device that can be used to implement the various components and/or methods described herein, according to certain embodiments.

According to an embodiment, the networked computer system 100 may include a plurality of user accounts stored in a database of the server 102. Each of the user accounts may be associated with one or more types of users 112A-112F, such as an accreditor user 112A of an accrediting body 108, an academic institution 110's users including an accreditation coordinator 112B (which also may be referred to as a program leader user), a department user 112C (e.g., a responsible party, a facilitator), a faculty user 112D, and/or a supervisor 112E (e.g., an instructor or preceptor), and a student user 112F. The database may store information associated with each of the users 112A-112F. Each of the users 112A-112F may log in to a website (or application) 114A-114F via an electronic computing device 116A-116F (e.g., by entering a username and password, or biometric information, such as facial recognition information). The computing devices 116A-116C are shown as desktop computers, and the computing devices 116D-116F are shown as smartphones (mobile devices). Although the example user electronic computing devices are shown in the drawings as smartphones and/or desktop computers with monitors, the electronic computing device 150 may be used and may be any type of electronic computing device, such as a desktop personal computer (PC), a smartphone (mobile device), a tablet computer, a laptop computer, a personal digital assistant (PDA), or an e-book reader, and the like. The user terminals 116A-116F may include a memory, a communication interface, a display, and a processor, as shown in FIG. 1B.

The user computing devices (or user terminals) 116A-116F may correspond to any computing device that a respective user 112A-112F is logged into. In this respect, for example, when the accreditor user 112A is logged into the website or application 114A, the current electronic computing device the accreditor user 112A is using is the accreditor user's computing device 116A. When the accreditor user 112A logs in from a different electronic computing device, that different electronic computing device is the accreditor user's computing device 116A. The software is application driven, and hence, it does not matter which electronic computing device a user logs into, as the application is accessible from different connected computing devices and in different forms (e.g., a desktop website, a mobile website, a mobile application). According to an embodiment, the accreditor computing device 116A may provide the data reports 104 to the responsive server 104 and/or to one of the computing devices via the responsive server 104.

The accreditor computing device 116A is an electronic computing device having an accreditor user logged in to the accreditor website/application 114A. An accreditor user is a user designated as an agent or employee of an accrediting body or agency, such as National Accreditors, regional accreditors, state accreditors, specialty accreditors, national boards, state boards and regulators as well as associations and governing bodies. All of these organizations create standards and oversight requirements for programs, department or schools and measure compliance with their standards. The accreditor computing device 116A may communicate with the other computing devices 116B-116F and/or with responsive server 102 over the network 106. The accreditor computing device 116A may provide data reports to the responsive server 104 and/or to one of the computing devices. The accreditor computing device 116A may execute certain tasks such as registration management (e.g., allowing only certain institutions to register to import the program standards information (e.g., criterions) and/or to upload evaluation reports). In an embodiment, the accreditor computing device 116A may perform the program evaluation method 500 of FIG. 5A. In an embodiment, the accreditor computing device 116A may be prohibited from accessing the program evaluation method 500 of FIG. 5A (e.g., the accreditor computing device and corresponding user may not have an account, and the systems and methods could be performed on the school/institution side without the accreditor's interaction).

The accreditation coordinator computing device 116B is an electronic computing device having an accreditation coordinator user logged in to the accreditation coordinator website/application 114B. An accreditation coordinator is a user designated as an agent, contractor, or employee of an institution (e.g., an academic institution or agency), and designated as an accreditation coordinator or other title corresponding to an accreditation coordinator or program leader. The accreditation coordinator computing device 116B may communicate with the other computing devices 116A and 116C-116F and/or with responsive server 102 over the network 106. The accreditation coordinator computing device 116B may perform the program evaluation method 500 of FIG. 5A.

The department user computing device 116C is an electronic computing device having a department user logged in to the department user website/application 114C. A department user is a user designated as an agent, contractor, or employee of an institution (e.g., an academic institution or agency), and designated as a department user, facilitator, or responsible party) or other title corresponding to a department user. The department user computing device 116C may communicate with the other computing devices 116A, 116B and 116D-116F and/or with responsive server 102 over the network 106. The department user computing device 116C may perform the program evaluation method 500 of FIG. 5A, which may be limited to only specified departments and/or program types.

The faculty computing device 116D is an electronic computing device having a faculty member logged in to the faculty website/application 114D. A faculty member is a user designated as an agent or employee of an institution (e.g., an academic institution or agency), and designated as a faculty or another title corresponding to faculty, such as a professor or adjunct faculty. The faculty computing device 116D may communicate with the other computing devices 116A-116C, 116E and 116F and/or with responsive server 102 over the network 106. The faculty computing device 116D may perform the program evaluation method 500 of FIG. 5A, which may be limited to only specified departments and/or program types, according to an embodiment. The faculty computing device 116D may perform the supervisor method 400 of FIG. 4A, according to an embodiment.

The supervisor computing device 116E is an electronic computing device having a supervisor member logged in to the supervisor website/application 114E. According to an embodiment, a supervisor member that may be designated as an agent, contractor, or employee of an institution (e.g., an academic institution or agency), and is designated as a preceptor or supervising instructor or another title corresponding to a preceptor or a supervising instructor. The faculty computing device 116E may communicate with the other computing devices 116A-116D and 116F and/or with responsive server 102 over the network 106. The supervisor computing device 116E may perform the supervisor method 400 of FIG. 4A, which may be limited to only specified departments and/or program types, according to an embodiment. The supervisor computing device 116E may perform the program evaluation method 500 of FIG. 5A, which may be limited to only specified departments and/or program types, according to an embodiment. Supervising Employer Profiles may be maintained in the database by administrators of the programs, and include personal information and license numbers of supervising employees (supervisors). A preceptor may not be an employee of the institution, according to embodiments.

The institution users (e.g., 112B-112E) may be program level users (e.g., even though a program level user, if the user has the corresponding permissions, the user can see all these other programs combined). Alternatively, a user may be an institution level user and see all programs associated with the institution (e.g., the Dean or President of a university may have the same full-access as an accreditation coordinator 112B, and the department user 112C, faculty 112D and supervisor 112E may only have relevant limited access).

The student computing device 116F is an electronic computing device having a student member logged in to the student website/application 114F. According to an embodiment, a student may be a currently enrolled student of an institution (e.g., an academic institution or agency), and be designated as a student or currently-enrolled student. However, once a student's enrollment status changes (e.g., to unenrolled), the data may remain as student data in the database (e.g., for historical reports). The database may also be controlled by a data retention policy (e.g., student data is deleted after ten years) and a privacy policy (personally-identifiable information is masked, encrypted and/or replaced). The student computing device 116F may communicate with the other computing devices 116A-116E and/or with responsive server 102 over the network 106. The responsive server may perform the student GUI method 300 of FIG. 3A with relation to the student computing device 116F, according to an embodiment. The student GUI method may include student homepage, skills, eval, time exception, preceptor, evals, comps, approvals.

The database may include each of the pertinent items of information displayed by each of the GUIs described herein. According to an embodiment, datapoints of the database may include time records, skill records, competencies (Comps), evaluations (evals), affiliate agreements, and supervising employer profiles (which may include what students are being supervised). Other data, as described herein, may be displayed in the database, which may include data stored in a similar fashion as the tables/records of data described below (e.g., the screen 644A may correspond to a table of data stored in association with each other). The screen 644A may correspond to a list of standard criterions associated with (stored in association with) a same program in a database.

As described above, the electronic computing devices 116A-116F may perform various operations and/or methods described herein. The responsive server 106 may perform some or all the processing with relation to the methods performed by the electronic computing devices 116A-116F. The responsive server 102 may provide the websites/applications 114A/114F by way of a plurality of GUIS, and may transmit GUI control information to cause the GUIs to provide user navigation as described herein.

The data/reports 104 of FIG. 1A represents interaction with cloud computing and/or data centers (e.g., server farms) that may host some data in an intermediate, temporary and/or permanent fashion. There may also be a client (browser) that communicates with a web server or other intermediary server provided along the network path, and hence the network connections of FIG. 1A may be direct or indirect connections. A session server may also be used along the network path and/or a database server (e.g., a cloud data center).

FIG. 1B illustrates a detailed view of an electronic computing device 150 that can be used to implement the various components and/or methods described herein, according to certain embodiments. Any of the electronic computing devices 116-116F may correspond to electronic computing device 150. The detailed view illustrates various components that may be included in either the electronic computing device 150 or the server 180 illustrated in FIG. 1C.

In an embodiment of the disclosure, as shown in FIG. 1B, the electronic computing device 150 may include one or more memories 152, and processing circuitry 154 (e.g., a controller, a hardware processor). The one or more memories 152 may hereinafter be referred to as a memory 152 or a local memory 152. The local memory 152 may be a local data storage. The memory 152 may include one or more storage devices and associated computer-readable media, such as a hard drive, or a solid-state drive. The processing circuitry 154 may include and provide functionality because of one or more processors (e.g., a hardware processor, a virtual processor, a distributed processor, central processing units (CPUs), a specialized processor, such as Graphics Processing Units (GPUs), Application Specific Integrated Circuits (ASICs)) executing software embodied in one or more tangible, computer-readable media. Such media may be media associated with a storage device, memory devices or chips, internal mass storage (e.g., Read-Only Memory (ROM), a Random-Access Memory (RAM)), a Compact Disc (CD), a Digital Versatile Disc (DVD), a thumb-drive, a removable hard drive, a solid-state drive, legacy magnetic media (e.g., a tape drive, a floppy disc drive), a specialized ASIC-based device, and/or the like. The software implementing various embodiments of the present disclosure can be stored in the storage devices and/or media executed by the processing circuitry 154.

"Computer readable media" or "computer readable medium" as used in connection with the specification encompass non-transitory media, transmission media, and/or carrier waves. The computer readable media and/or memory 152 may store computer code (software) for performing various computer-implemented functions, such as functions of the website/application that the user is logged into. The computer code may include instructions that, when executed by the processing circuitry 154, causes the processing circuitry to execute various functions, processes, parts, operations and/or methods (collectively referred to hereinafter as functions, methods, or operations). The various functions, operations, and methods pertinent to this disclosure are explained in detail below. However, other functions, operations and methods that are known to one or ordinary skill in the art could also be performed. The processing circuitry 154 may be configured to perform the various functions, methods, and operations (e.g., by being programmed to do so via computer executable instructions) discussed in more detail herein.

The software may cause the processing circuitry 154 and specifically the processor(s) to execute particular processes or particular parts of particular processes described herein, including defining data structures stored in RAM and modifying such data structures according to the processes defined by the software. In addition, or as an alternative, the processing circuitry 154 may provide functionality because of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

As shown in FIG. 1B, the electronic computing device 150 may also include or be at least configured to be electrically connected (or wirelessly connected) to one or more output devices (e.g., peripheral, or internal). The electronic computing device 150 may use the input/output interface 160 to communicate with one or more peripheral devices, such as, one or more of: a display device (e.g., an external desktop monitor or a touch screen display panel), a keyboard, a microphone (e.g., for voice input), a camera (e.g., for gesture input), a mouse, a speaker, a microphone, a joystick, a scanner, a trackpad, a printer, and/or a biometric capture device (e.g., a device that captures one or more of: fingerprint, palm print, iris information). The peripheral devices may include user input devices (e.g., a mouse, keyboard, microphone) and/or output devices (e.g., speaker, display) and be connected to the processing circuitry 154 by the network communication interface 158.

The display 156 may include any type of display including a projector or a display screen, such as, a touch screen display panel, an organic light-emitting diode (OLED) screen, a liquid crystal display (LCD) screen, a cathode ray tube (CRT) screen, and/or glasses. The display 156 may be electrically coupled to the processing circuitry 154 and the processing circuitry 154 may be configured to control (or cause) the display 156 to display information (e.g., display the information discussed in the methods and operations below). The display 156 may be provided on an outer surface of a housing of an electronic computing/display device (e.g., a smartphone).

The electronic computing device 150 may further include a communication interface 158 electrically coupled to the processing circuitry 154. The communication interface 158 may be configured to receive data transmitted from one or more electronic devices (e.g., user terminal devices, other electronic display devices) and/or one or more servers. The communication interface 158 may be a network communication interface 158. Networks may be, for example, wired, wireless, or optical. Networks can provide real-time data transfer and include a local area network (LAN), a wide-area network (WAN), and/or the Internet. Examples of networks include Ethernet, wireless LANs, cellular networks (e.g., Global System for Mobile Communications (GSM), 3G, 4G, 5G, Long-Term Evolution (LTE)).

The communication interface 158 may be configured to transmit, via, for example, control by the processing circuitry 154, data to the one or more electronic devices over a network or wirelessly. The processing circuitry 154 may also include interface to one or more communication networks (e.g., via the communication interface 158). The processing circuitry 154 may be configured to control (or cause) the display 156 to display information, or alternatively, transmit the display information over the communication interface 158 to another electronic computing device, or over the input/output interface 160 to a standalone display device.

The input/output interface 160 may be wired (e.g., universal serial bus (USB) drive, external RAM/ROM, external processor, data port) or wireless (e.g., short-range communication protocols, syncing, Bluetooth®, radio frequency (RF), near field communication (NFC) or Wi-Fi®). The communication interface 158 may be a wireless (e.g., short-range communication protocols, syncing, Bluetooth®, radio frequency (RF), near field communication (NFC) or Wi-Fi®) input/output interface 160.

Figure 1C:
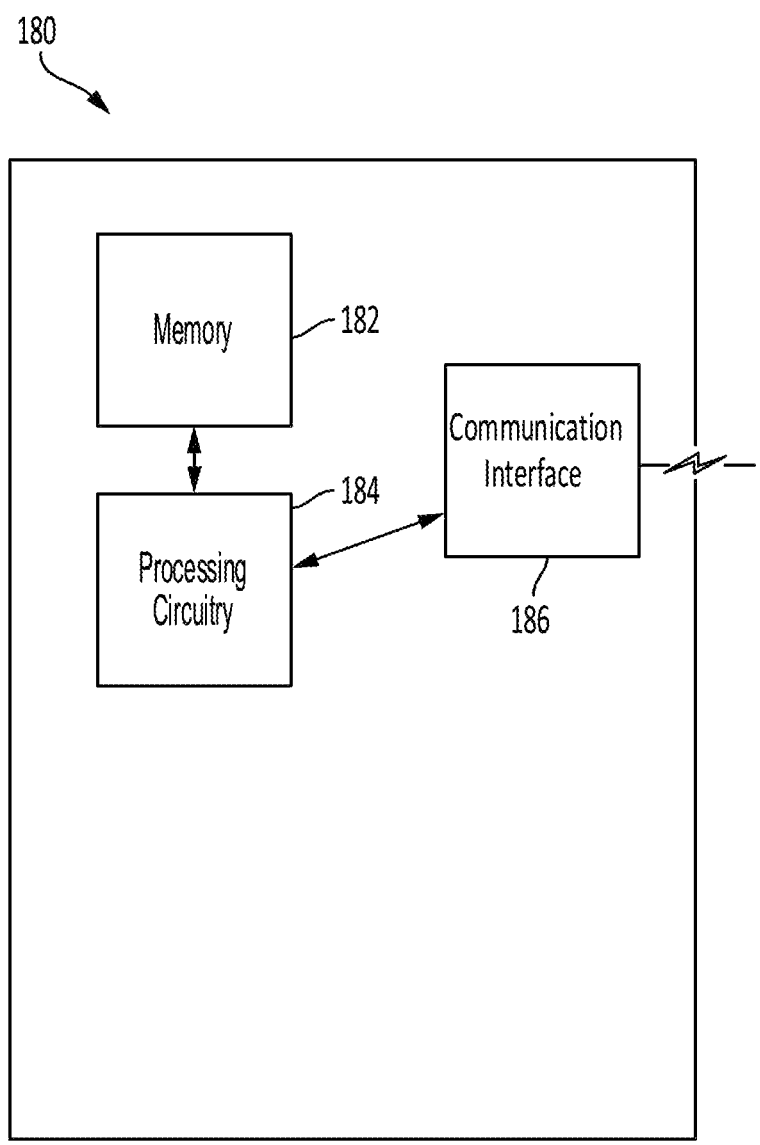
FIG. 1C illustrates a detailed view of a responsive server that can be used to implement the various components and/or methods described herein, according to certain embodiments.

FIG. 1C illustrates a detailed view of a responsive server 180 that can be used to implement the various components and/or methods described herein, according to some embodiments. In particular, the responsive server 102 in FIG. 1A may correspond to the responsive server 180 illustrated in FIG. 1C. The detailed view illustrates various components that may be included in either the electronic computing device 150 illustrated in FIG. 1B or the responsive server 180 illustrated in FIG. 1C. In an embodiment of the disclosure, as shown in FIG. 1C, the responsive server 180 may include one or more memories 182 (e.g., a local memory or local data storage) and processing circuitry 184 (e.g., a controller, a hardware processor). The responsive server 180 may further include a communication interface 180 electrically coupled to the processing circuitry 180. The communication interface 1106 may be configured to receive data transmitted from one or more external electronic computing devices (e.g., electronic computing devices 116A-116F), and/or one or more other servers. The communication interface may be similar to or include functionality like the network communication interface 158 and/or the input/output interface 160.

The processing circuitry 184 may be configured to store, in the memory 182, data received from various sources. For example, the processing circuitry 184 may be configured to access and/or receive program standards information 104 (via the communication interface 186) and store the program standards information 104 (e.g., various files and/or documents providing criterion for meeting a program standard) retrieved from the Internet and/or the accreditor computing device 116A as data received from the communication interface 186. For example, the processing circuitry 184 may be configured to store various documents related to standards information from various third-party or official sources received as data from the communication interface 186.

The responsive server 180 may be configured to provide automatic real time updates (e.g., updated information, alerts and/or reminders) to the respective electronic computing devices, as discussed below. Real time may correspond to instantaneous, near real time (near instantaneous) or a combination thereof, which may responses to requests within a nanosecond. As discussed below, the responsive server may perform real time data polling and provide alerts, which may be Application Programming Interface (API) driven. For example, the web app reaches out to the API, which generates the API spec as the page is built. The web app/page reaches out to the API and the API feeds back the results and it populates the web page (e.g., via a RESTAPI technology, such as rest API, Open API and JSON format). The API may be documented and made available to vendors that want to present a subset of this data.

The processing circuitry 184 may be connected to each of the other components of the server 180 and may include one or more of the components of the electronic device 150 of FIG. 1A. While explaining the responsive server 180 according to certain embodiments, a detailed description of the contents (e.g., processing circuitry, media, memory, communication interface) overlapping with the electronic computing device 150 were/are omitted. The components and configurations shown in FIGS. 1A-1C are exemplary in nature and are not intended to suggest any limitation as to the scope of the disclosure. According to an embodiment, the electronic computing device structure and/or functionality may also be performed by the responsive server 180. According to an embodiment, the functionality of the server may be performed by the electronic computing device (or user terminal) 150. The functionality of the electronic computing devices, as defined by the logged in user, may also be performed by one of the other user terminal electronic computing devices. The server may perform control to build a neural network and train the neural network using a requisite number of standards criterion associated with the specific program. Using the trained neural network, user items (e.g., ELAs, qualitative descriptions) may be predicted based on historical logs. Moreover, patterns may be detected in the data, such as detection of non-organic time exceptions and/or patterns of non-organic time exceptions.

Figure 2:
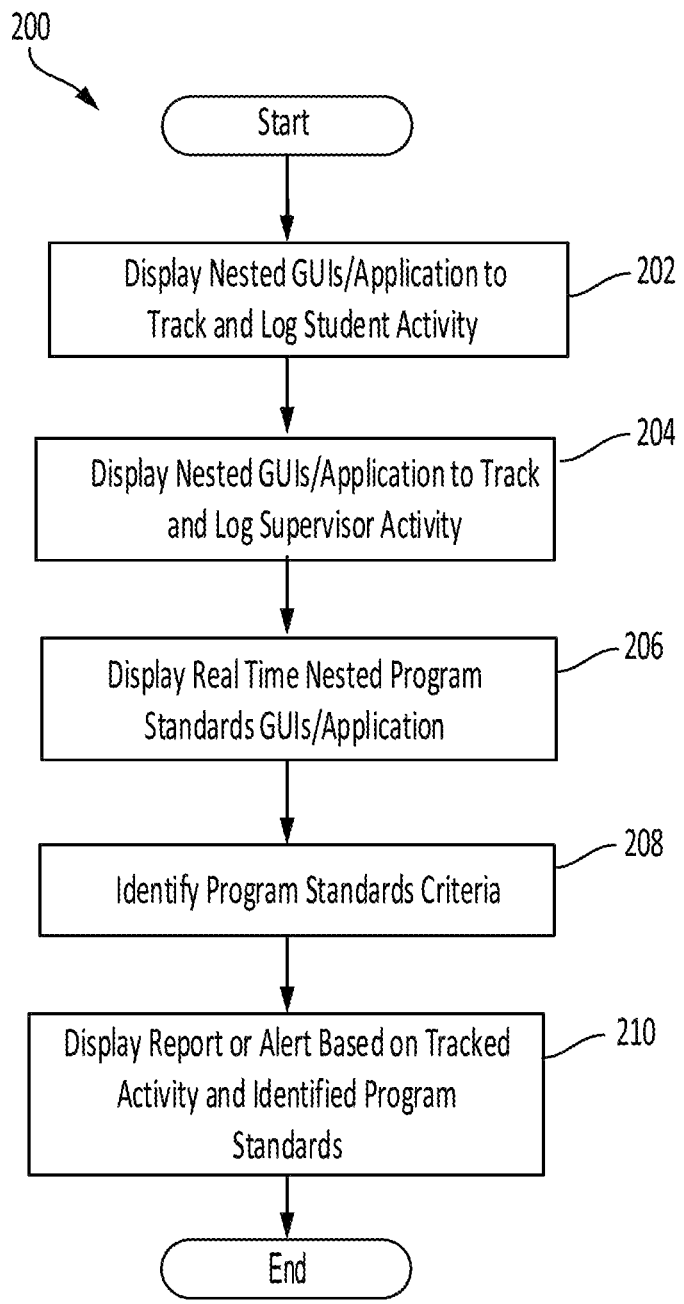
FIG. 2 illustrates a flow chart of a real time server method performed by processing circuitry, according to certain embodiments.

FIG. 2 illustrates a flow chart of real time server method 200 performed by processing circuitry, according to certain embodiments of the disclosure. The processing circuitry may correspond to the processing circuitry 154 or 184 discussed in FIGS. 1B and 1C above, or correspond to a combination of the processing circuitry of the electronic computing device 150 being controlled by (or receiving user interface information from) the responsive server 180. As discussed below, the processing circuitry 154 or 184 may be configured to execute code (instructions code) stored in a memory, which causes the processing circuitry to execute a method, a website and/or an application. The real time server method 200 executed by the processing circuitry 154 and/or 184 may include Operations 202-210, as shown in FIG. 2A, according to an embodiment. Although the Operations 202-210 are shown in an order in FIG. 2, the Operations 202-210 may be performed in a different order.

With reference to FIG. 2, according to an embodiment, the processing circuitry may be configured to perform a real time server method 200 including the following operations: tracking and logging student activity (including displaying of nested student GUIs to perform such) (Operation 202), tracking and logging supervisor activity (including displaying of nested supervisor GUIS to perform such) (Operation 204), displaying a customizable, real time (dynamically updated) program standards GUI (Operation 206), identifying program standards criteria (Operation 208), and displaying an accreditation report or alert based on the tracked activity and identified program standards (Operation 210). The operations may also include comparing the identified program standards criteria, with actual institution data (e.g., student activity data and/or supervisor verification of such), and based on the comparison, providing real time updates and/or alerts regarding the comparison. The resultant criteria of the revised standards can be compared against the real data, which may indicate a program that is out of compliance (or head towards out of compliance), reported to the user, such as, for example, in the form of a report. Tracking and logging activity may include monitoring the tracked and logged activities.

Nested UI for Tracking and Logging of Student Activity

Figure 3A:
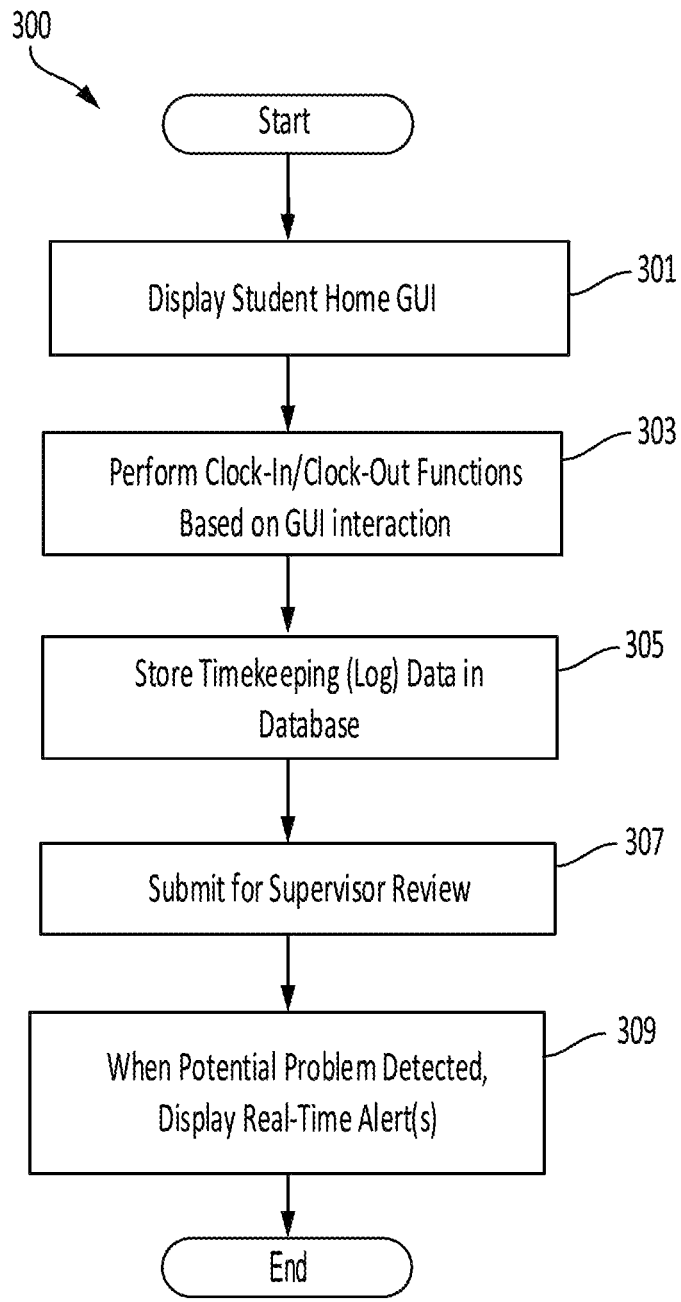
FIG. 3A illustrates a flow chart of real time student GUI method performed by processing circuitry, according to certain embodiments.

FIG. 3A illustrates a flow chart of real time student GUI method 300 performed by processing circuitry, according to certain embodiments. The tracking and logging of student activity (Operation 202 of FIG. 2) may include one or more of Operations 301-309 of the student GUI method 300 of FIG. 3A. The student GUI method 300 may include displaying, by a display of or coupled to an electronic computing device, a student GUI (Operation 301), performing a clock-in/clock-out function (e.g., based on GUI interaction) (Operation 303), storing timekeeping (log) data (Operation 305), submitting for supervisor review (Operation 307), and displaying real-time alert(s) when a potential problem is detected (Operation 309). The log data may correspond to student time records (e.g., clock-in records and clock-out records and/or matching pairs of clock-in/clock-out records, and/or unmatched time records (i.e., a Clock-in with no corresponding Clock-out log entry)).

The time records may include organic clock-ins and/or clock-outs by the student but may also include exception time records where the student manually entered the time they missed (manually being via a time exception GUI). Preceptors or admin can approve student time records in the database, as well as edit them or add new time records. All data components discussed herein, including the GUI data and data tables may be stored in the database in association with the student, supervisor, institution, site, etc.

Figure 3B:
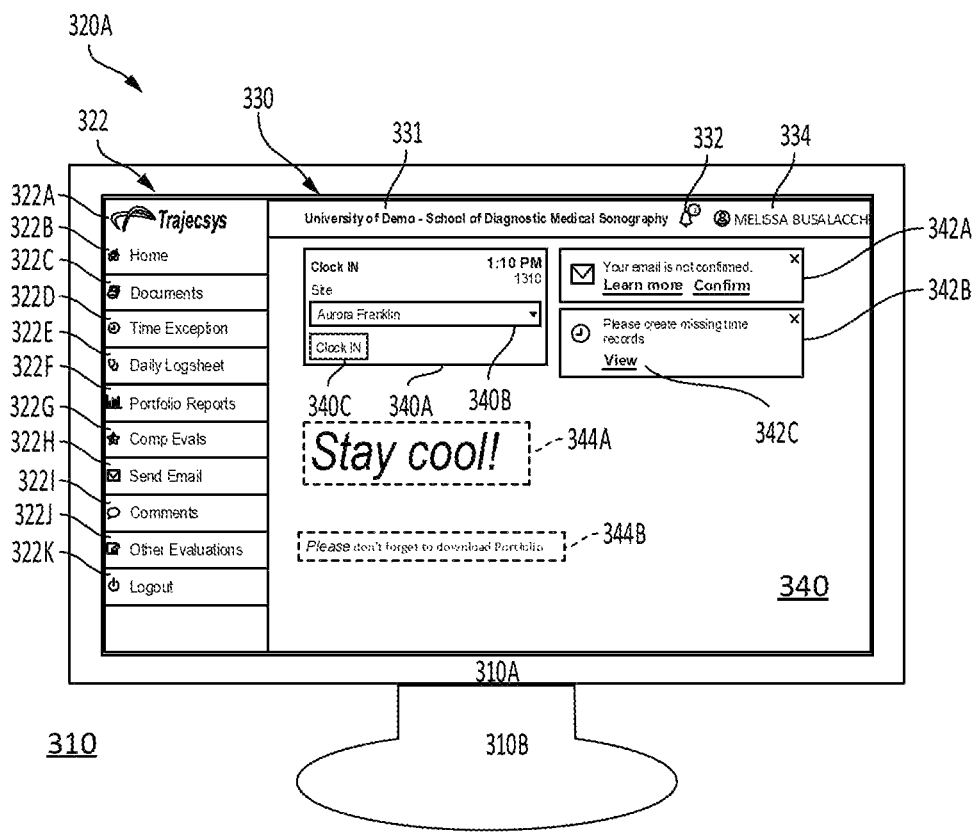
FIG. 3B illustrates an electronic display device displaying an example of a nested student GUI, according to certain embodiments.

FIG. 3B illustrates an electronic display device 310 displaying an example of a nested student GUI 320A (e.g., a nested enrolled student GUI 320A), which may correspond to a student home screen 320A. The electronic display device 310 may include a computer monitor 310 having a display screen 310A and a monitor stand 310B. The electronic display device 310 may correspond to and/or be electronically coupled to the electronic computing device 150 and/or the server 180. Nested GUI, as used herein, may correspond to a GUI with a fixed display portion (e.g., a menu panel and/or a status bar) and a dynamic display portion (e.g., a dynamic display portion first displays a home screen followed by a sub screen corresponding to a button click in the fixed display portion).

The nested student GUI 320A may include a vertically-extending menu bar column 322, a header display area 330, and a dynamic display area 340, according to certain embodiments. The header display area 330 and the dynamic display area 340 may be displayed adjacent to the menu column 322 in the student GUI 320A.

The menu bar column 322 may include a static text field 322A statically displaying a company logo, and interactable hyperlinked buttons 322B-322K. The interactable buttons 322B-322K may be buttons (e.g., text or icon buttons) and display certain types of information and/or different GUIs based on (e.g., in response to) user interaction with the button (e.g., when the button is activated). The buttons may be hyperlinked to other webpages/GUI screens and transition between webpage/GUI screens within a respective application/website.

Figure 3C:
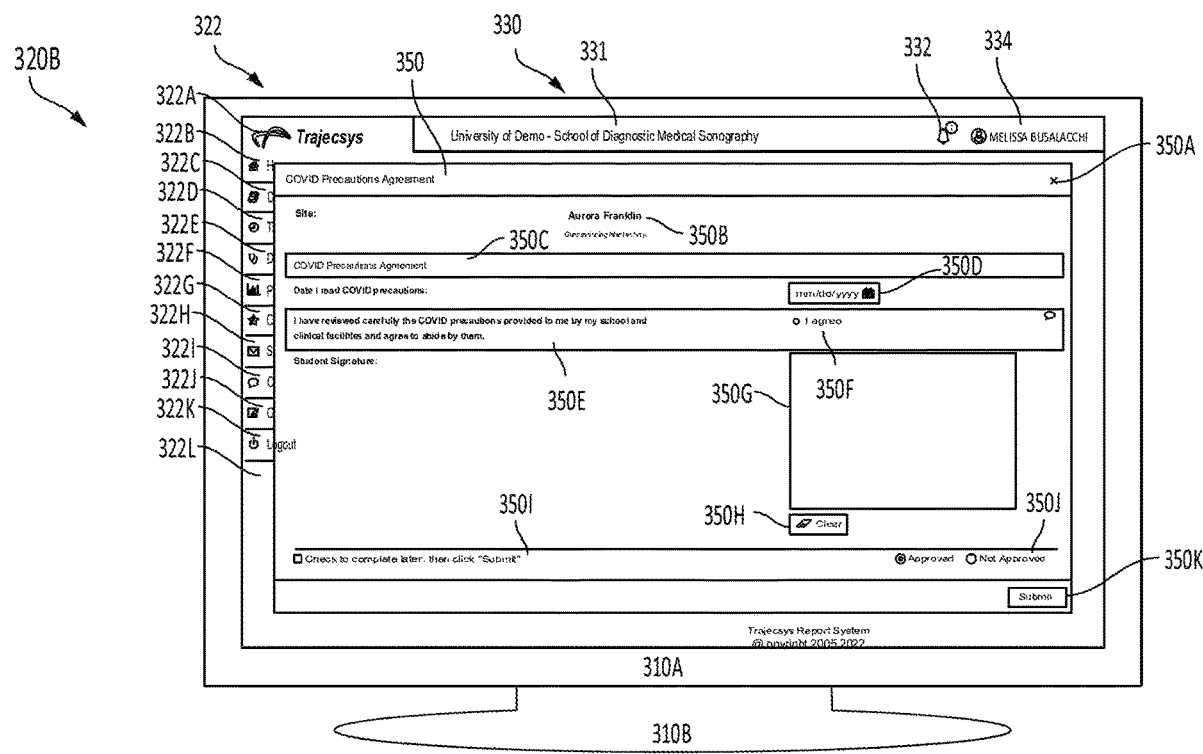
FIG. 3C illustrates an electronic display device displaying an example of a nested student GUI with an agreements pop-up window, according to certain embodiments.
Figure 3D:
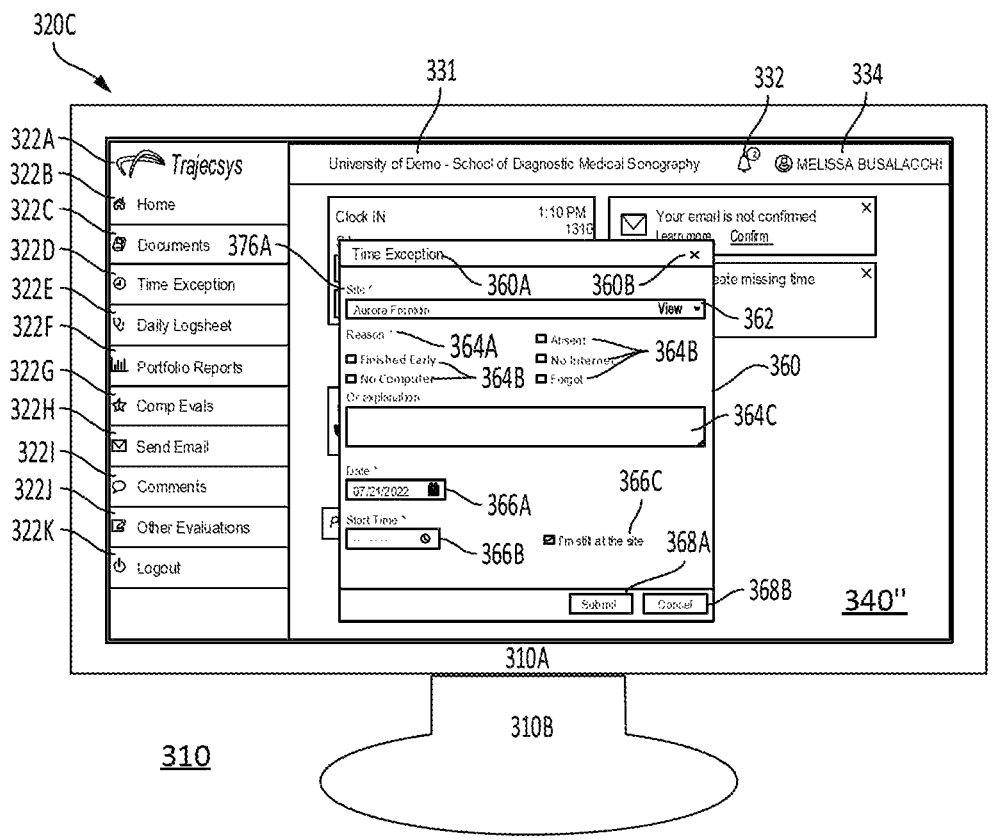
FIG. 3D illustrates an electronic display device displaying an example of a nested student GUI with a time exceptions pop-up window, according to certain embodiments.

The home button 322B may cause the enrolled student nested GUI home page 320A to be displayed and/or to refresh when interacted with. The documents button 322C may cause a list of documents or a single document to be displayed when interacted with (e.g., a Covid student-organization agreement/document GUI 320B as shown in FIG. 3C). The time exception button 322D, when interacted with, may cause a time exception GUI pop-up to be displayed. The time exception GUI may correspond to time exceptions pop-up window 360 in FIG. 3C. The daily log sheet button 322E, when interacted with, may cause a daily log sheet GUI to be displayed, such as daily log sheet GUI 360 of FIG. 3D. According to an embodiment, the log sheet is entered in a multi-page wizard, but the summary on the table of GUI 360 of FIG. 3D shows all the meaningful fields.

The portfolio reports button 322F may cause student-specific reports to be displayed when interacted with. Generating the student-specific portfolio report may include aggregating the student's data from the database to generate a skill breakdown report. The skill breakdown report may include a list of all the unique skills that the student experienced, and how many times they observed, assisted, or performed them. Additionally, the skill breakdown report may list (e.g., by date) all competency evaluations that the student has taken on each skill. Competencies (or comps) may be competency exams and/or evaluations filled in by Preceptors or administrators on a student's skill and/or experience.

The comp evals button 322G may cause evaluations (e.g., online surveys) of the current program (e.g., the Medical Sonography program at the University of Demo) to be displayed when interacted with. For example, the comp evals button 322G may cause sample evaluations for the respective student to view, so they know what they will be scored on. Due to their flexibility, evaluations can be configured to be filled out by any user type: student, preceptor, administrator, etc.

The send email button 322H may cause an email application to be displayed and/or a draft email to be started and displayed. The comments button 322I, when interacted with, may display a student comments GUI (e.g., a text field and submission button so that the logged in student may leave comments regarding the program). The other evaluation button 322J may display additional surveys when interacted with. For example, user-built evaluations may be made available by clicking 322J in FIG. 3B. A list of eligible evaluations may be presented and clicking any of those evaluations causes the GUI of FIG. 3C to be displayed (though the questions asked may be different based on eval). The logout button 322K may cause the student user to logout when interacted with (there may or may not be a confirmation pop-up window to confirm the action (e.g., logging out)). A log in screen may be provided (e.g., where a user enters login credentials (username/password) and/or performs a registration function) prior to accessing one or more of the GUIs and/or applications described herein. The user may hence be a logged-in user (with information stored in association with the standard criterion in the database).

The header 330 may include logged-in program information 331, a bell icon 332 and a logged-in user button 334. The logged-in program information 331 (e.g., corresponding to a program identifier) may correspond to a current program (e.g., current program identifier) that the logged-in user (e.g., the logged-in student) is associated with in the database. The bell icon 332 may be an icon that provides alerts for notifications and a count of the number of alerts and/or notifications. For example, the bell icon 332 may display a count of student alerts and/or notifications, which can be any form of alert, and related to any part of the application. The logged-in user button 334 may display the name of the logged-in user and/or may correspond to a button for logging in/out and/or changing user.

The dynamic display area 340 may include one or more display areas. For example, the dynamic display area 340 may include real time clock-in/clock-out functionality area 340A, which may include a drop-down menu 340B that may correspond to a site location (allowing a user to select a site location) of the clock-in, and a clock-in (start) button 340C. The clock-in/clock-out functionality allows a student to record/log contemporaneous timekeeper activity/information (e.g., via the clock-in button 340C).

The clock-in start button 340C, when interacted with, starts a timer associated with the logged in student 334. After the clock-in button 340C has been selected, and the timer started, the clock-in button may be replaced by a clock-out button at the same position. The clock-out button may display "Clock OUT" and stop the timer when interacted with. The processing circuitry may calculate time entry log/record information corresponding to the clock-in time and clock-out time (i.e., respective timestamps corresponding to when the buttons were pressed). The time entry log/record information may include real time location information, such as global positioning system (GPS) information, corresponding to the start time, stop time and/or time entry duration (e.g., duration between a clock-in and a clock-out) and location (geo-location) of the time transaction. One of the warnings/alerts that causes an anomaly of a matching time entry (i.e., that needs careful review) is when a student's expected location (e.g., site) is outside of a threshold distance away from the student's actual location when the time transaction (e.g., clock-in or clock-out) is performed.

The dynamic display area 340 may also include alerts, reminders and/or warnings, such as reminder 342A and reminder 342B. The reminders 342A and 342B may include hyperlinked buttons to perform a relevant action (e.g., "Learn more" for receiving additional information, "Confirm" button to confirm accuracy of stored information, "View" 342C to view relevant information, such as current time records and/or information regarding what time records are missing), and/or a daily log sheet GUI as described herein. As shown in FIG. 3B, the reminders 342A and 342B may include exit out buttons (shown as an 'x' in the upper righthand corner) for closing out the reminder/alert (which causes the reminder/alert to no longer be displayed).

The dynamic display area 340 may also include real time announcements and/or reminders, such as a weather-related announcement 344A (e.g., "Stay cool!" when the temperature is above a high temperature threshold or range) and a program related reminder 344B (e.g., "Please don't forget to download Portfolio" when a certain period of time (e.g., school semester) ends). The announcements, alerts and/or reminders may or may not include hyperlinks and or exit out buttons.

The displayed data and/or alerts, reminders and announcements may change based on changes/updates to the database made by, for example, other users associated with the program, and the student's participation in the program. The dynamic display area 340 may dynamically change what is displayed (in real time or near real time) based on user actions in other areas of the nested student home screen 340, such as user actions/interactions with buttons in the column menu bar 322. For example, when the documents button 322C is interacted with, such as by being clicked on, the dynamic display area 340 may change and/or a pop-up window 350 may be displayed superimposed on the dynamic display area 340, 340'. For example, when documents button 322C is clicked on, the pop-up window 350 may be displayed superimposed over the GUI 320A, as shown in the GUI view 320B of FIG. 3C. That is, the transition from the GUI 320A of FIG. 3B to GUI 320B in FIG. 3C is an example GUI transition result of the documents button 322C being interacted with. As shown in FIG. 3C, the non-overlapped portions of the real time student GUI display may remain the same (or for example, the time/date 210B may update normally with the remaining non-overlapped portions of 320, 330 and 350 each remaining the same or similar).

Remaining the same, similar, static, or semi-static may correspond to remaining the same where normal updates are still applied (e.g., date/time is updated, alerts/notifications, such as bell notifications 332 are displayed). User interactions with a button (e.g., "interacted with") may correspond to being tapped, selected, clicked, activated, long pressed, short pressed or the like, and/or verbal commands, cues and/or gestures, and vice versa (e.g., each of these user actions may correspond to or be substituted for other user actions). According to embodiments, the description of buttons and/or GUI items (e.g., drop-down menus and the like) may be described by the action they perform, which may be in response to a detected event, such as a user interaction (even if the user interaction is not explain with the details of the GUI element (e.g., button)).

FIG. 3C illustrates an electronic display device 310 displaying an example of a nested student GUI 320B with an agreements form pop-up window 350, according to certain embodiments. The nested student GUI 320B shows a pop-out window/sub screen 350 related to a health-related agreement (e.g., a COVID agreement) form. The agreement pop-out window 350 may be superimposed over the GUI 320A as shown in FIG. 3C. The agreements form pop-up window 350 may correspond to a random evaluation and/or a user-built evaluation (e.g., built by one of the institution users).

The agreement pop-out window 350 include a header ("COVID Precautions Agreement"), an exit out button 350A (to close the window), a site information 350B (which may be a recommendation based on student location information and/or logged activity), a document selection field 350C, a modifiable read date calendar date input menu 350D, a declaration field 350E, a declaration field confirmation button 350F, a signature box 350G, a clear button 350H, a complete later checkbox 350I, an approved/not approved pair of toggleable buttons 350J, and a submit button 350K.

The site information button 350B may display a name (e.g., "Aurora Franklin") that has been selected by the student user and/or is recommended based on the student user's current location and/or previous location and/or log history. The document selection field 350C displays the name of the current agreement (e.g., "Covid Precautions Agreement") but could be selectable to show a menu of incomplete agreements that are currently required by the institution/organization. When the student user changes the document in the document selection field 350C, a different agreement form may be displayed as the pop-out window.

The modifiable read date calendar input menu 350D may be displayed adjacent to text (e.g., "Date I read COVID precautions") and allow a student user to input the date corresponding to the text. The declaration field 350E includes text regarding an assertion (e.g., agree to abide by rules), and the confirmation button 350F may be adjacent to the declaration field, and allow a student user to input an indication that the text of the declaration field 350E is agreed to. The signature box 350G is configured to receive user input corresponding to e-signature capabilities (e.g., a drawn signature, or an auto-generated signature). The clear button 350H resets/clears any markings/drawings in the signature box 350G. The complete later check box 350I provides the student user a function to save the user input entered into the agreements form/pop-up window 350 to the database to be worked on later. When the form 350 is worked on later, the information previously input may be pre-populated from a previously saved "complete later" version of the form.

The approved/not approved button 350J provides a pair of buttons to indicate that the agreement (e.g., the language of declaration field 350E) is approved. The submit button 350K causes the information related to the agreement to be transmitted to the database and updates the database to indicate the specific agreement 350C has been completed (or remains incomplete, if for example, it is to be completed later via button 350I).

FIG. 3D illustrates an electronic display device 310 displaying an example of a nested student GUI 320C with a time exception pop-up window 360, according to certain embodiments. When the time exceptions button 322D is interacted with, such as by being clicked on, a time exception pop-up window 360 may be displayed superimposed on the dynamic display area 340". For example, when time exceptions button 322D is clicked on, the pop-up window 360 may be displayed superimposed over the GUI 320A, as shown in the GUI view 320C of FIG. 3D. That is, the transition from the GUI 320A of FIG. 3B to GUI 320C in FIG. 3D is an example result of the time exception button 322D being interacted with. As shown in FIG. 3D, the non-overlapped portions of the real time student GUI display may remain the same or similar.

The time exception pop-up 360 may prompt a user to enter in missing time (e.g., missing time may be a time entry expected to be entered in the database but that has not been entered, such as based on a student clinical schedule or the like). The time exception (or missing time entry) may be a time entry that was not captured contemporaneously with the logged activity and that the student was expected to have completed by the current date or date and time.

The pop-out window 360 displays a user interface to enter time exception information (or a non-contemporaneous time log entry). The pop-out window 360 may include a header 360A (e.g., "Time Exception") for a title of the pop-up window 600, an exit out button 360B (to close the window 360), a site information drop-down menu 362B, static text displaying "Reason" 364A, multiple reason checkboxes 364B, and a text entry box 364C for typing in an explanation as a reason.

The site information drop-down menu 362 is configured to receive a selection or text input corresponding to a site. In FIG. 3D, the site information drop-down menu 362 may include a "View" button to view the is a site drop-down menu, and the user interface allows the user to pick which site the student is entering a time record for. The initial or default selection for the site information drop-down menu 362 (e.g., Aurora Franklin) may be a recommendation based on missing time entries, student location information and/or previously logged activity (e.g., a site where a missing time entry had been previously logged by this student). The information drop-down menu 362 may display the selected site name (e.g., where Aurora Franklin is currently displayed) after a new site selection is made. According to an embodiment, the site information drop-down menu 362 provides a GUI for the student user to pick between sites that the student is clocking into/out of.

The multiple reason checkboxes 364B may corresponding to different predetermined types of reasons for the non-contemporaneous/non-organic nature of the time entry (e.g., finished early, no computer, absent, no internet, forgot, and the like), and a text entry box 364C may be provided in the GUI for typing in an explanation as a reason (e.g., when "No computer or explanation" is the reason). The text field 364C may be configured to receive keyboard user input or other types of user input (e.g., tapping on virtual keyboard, voice input, gesture inputs). The multiple reasons checkboxes 364B and/or the text field 364C provide an interface for the student user to saves the reason the student did not enter an organic time record.

Referring to FIG. 3D, the pop-out window 360 may also include a modifiable calendar date menu 366A, a modifiable start time clock menu 366B, a modifiable currently on-site check-box 366C, a submit button 368A and a cancel button 368B. The modifiable calendar date menu 366A may be a modifiable calendar menu for choosing a date on a calendar (e.g., 7/21/2022 as shown in FIG. 3D), and the start time clock menu 366B may be a time/clock selection mechanism for choosing a time of day. The currently on-site check-box 366C may, when the submit button is entered, cause the timer to start but back dated for the start time entered in the start time field 366B on the date in the modifiable calendar date menu 366A. When the on-site check-box 366C is not selected (not checked), an "end time" time menu similar to the "start time" time menu 366B may be displayed below the "start time" time menu 366B so that the student may enter their end time. When the submit button 386A is interacted with, the networked computer system (e.g., server or electronic device) may cause a non-contemporaneous time entry to be recorded as a time entry record and stored in the database in association with the student (e.g., the student ID) and an indication the time entry is not a regular/normal or contemporaneous time entry. The time entry records may include the site name or ID, reason information, a date, a start time, an end time, and a duration. The cancel button 368B may have a same or similar function as the exit out button 360B.

Figure 3E:
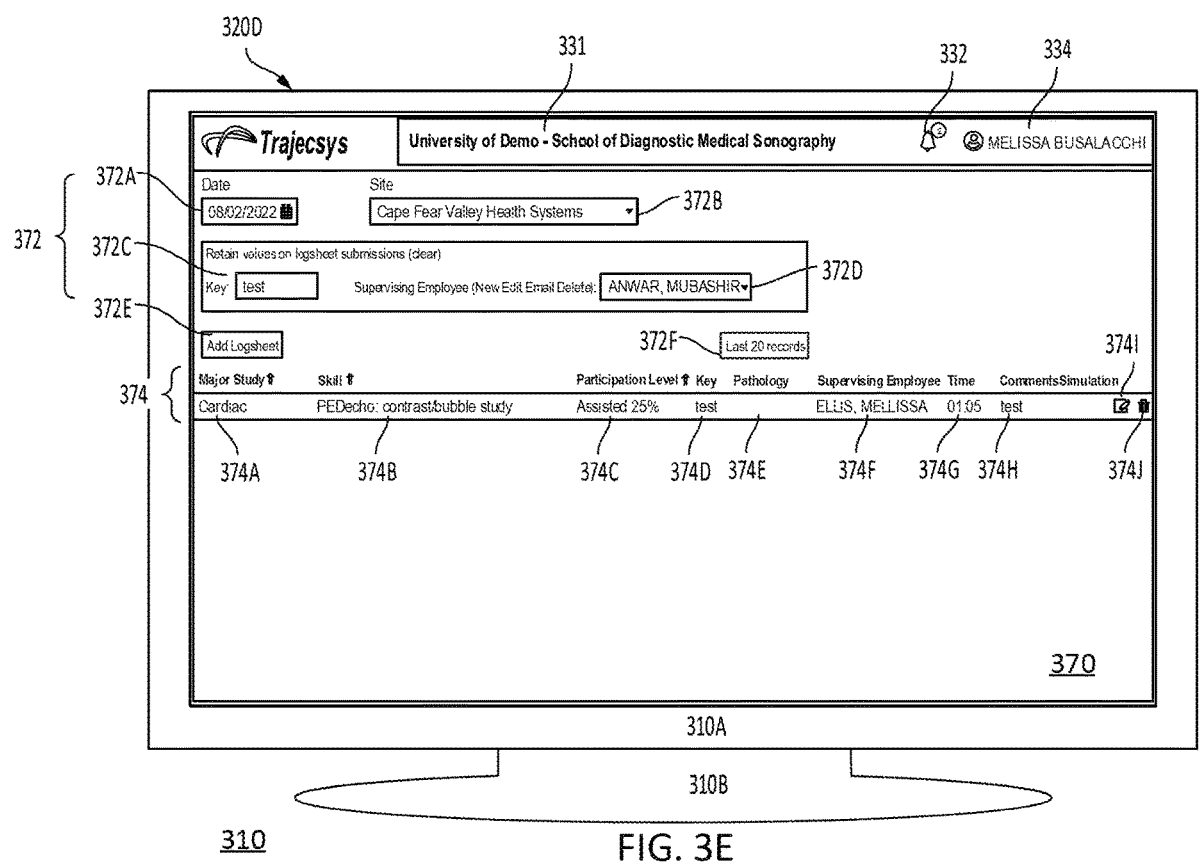
FIG. 3E illustrates an electronic display device displaying an example of a nested student with a daily log sheet window, according to certain embodiments.

FIG. 3E illustrates an electronic display device 310 displaying an example of a nested student GUI 320D with a daily log sheet display area 370 (or sub screen 370), according to certain embodiments. The daily log sheet display area 370 may be displayed when the daily logsheet button 322F is interacted with.

The daily log sheet display area 370 may be configured so that the student user can add a new log sheet and view previous log sheets. Daily log sheet display area 370 may include a user entry area 372 including a modifiable calendar date menu 372A, a toggleable drop-down site menu 372B, a Key text input field 372C, a Supervising Employee toggleable drop-down menu 372D, an Add Log sheet Button 372E and a "Last 20 Records" button 372F.

The calendar menu 372A and the site menu 372B may be similar to the previously mentioned calendar and site menus in that they each respectively allow for easy user selection of the pertinent calendar date, and site, respectively. The Key text input field 372C, which corresponds to the Key column 374D, corresponds to an optional key component to log sheets. The key can be filled with anything up to 5 characters long, according to an embodiment. The key allows program data regarding individuals (e.g., patients) to be identified in aggregate without actually providing a unique identifier. According to an embodiment, a use case for the key field is that the same key field is stored in association with multiple logs sheets to show that they were all performed on the same patient, e.g., by a same student.

The Supervising Employee toggleable drop-down menu 372D is configured to allow a student user to choose a supervising employee that is assigned for supervising the student's activity. The supervising employee may correspond to any user account that is assigned to supervise the student, such as a preceptor account, etc.

When the Add Log sheet button 372E is interacted with (e.g., clicked), a new log sheet wizard may be opened and displayed. For example, the new logsheet wizard may have a similar design as GUI 320E in FIG. 3F. When the Last 20 Records button 372F is interacted with, the display region 374 is updated (e.g., the display region 374 may show the 20 newest/most recent log sheets, which may not be currently visible on the page, such as when the page defaults to today's log sheets only).

The display region 374 may include displaying various information related to the log sheets. For example, the display region 374 may include a major study column 374A, a skill column 374B, a participation level column 374C, a key column button 374D, a pathology column 374E, a supervising employee column 374F, a time column 374G, a comments column 374H, an edit button 374I and a delete entry button 374J.

The edit column button 374I may allow the log entry to be edited, and the delete entry button 374J may allow the log entry to be deleted. Multiple log entries may be displayed corresponding to the displayed log entry.

Figure 3F:
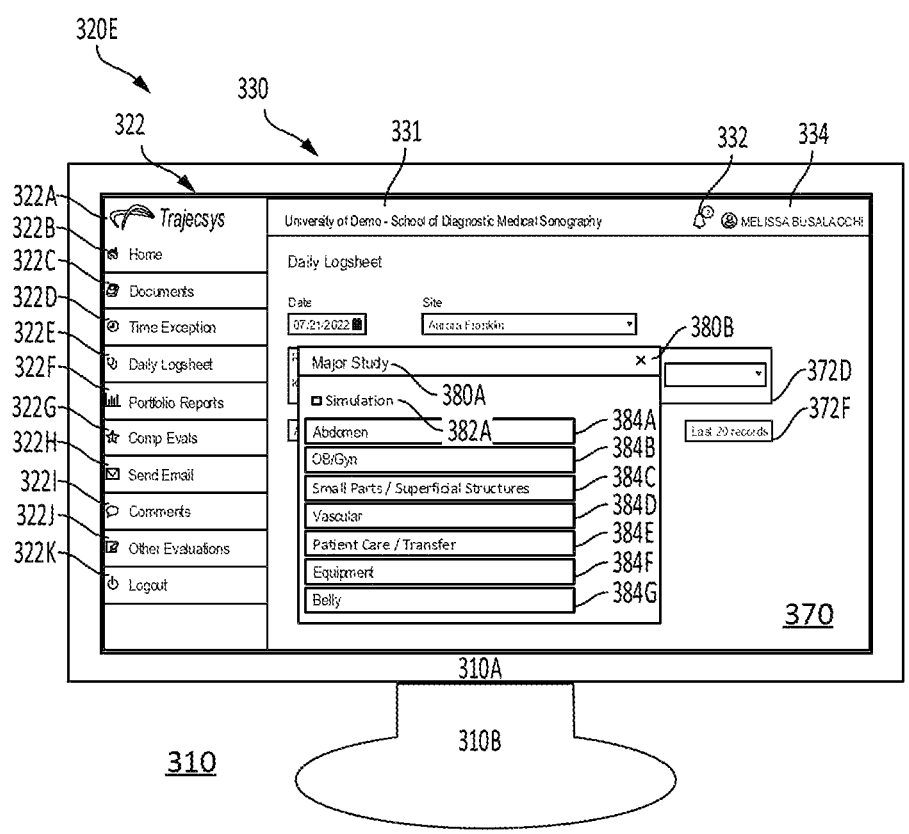
FIG. 3F illustrates an electronic display device displaying an example of a nested student GUI with a daily log sheet display area and a major study pop-up, according to certain embodiments.

FIG. 3F illustrates an electronic display device 310 displaying an example of a nested student GUI 320E with a daily log sheet display area 370 and a major study pop-up 380A (with an exit out button 380B), according to certain embodiments. When the major study pop-up window 380A is displayed (e.g., in response to Add Log sheet button 372E or edit button 374I being interacted with), a simulation check box 382A and a menu of selectable major study options 384A-384G are available for user selection. The simulation checkbox 382A is a user interface element that is used by a student to indicate that the student is reporting a simulated performance of the skill (on a mock patient or a mannequin, for example). When a student user selects one of the major study options 384A-384G, the selected option is stored as major study information for the student user and/or the current daily log sheet. The major study pop-up window 380A may be a part of a log sheet wizard.

While explaining the various user interfaces (e.g., the real time student user interfaces in FIGS. 3B-3F) according to certain embodiments, a detailed description of the contents (e.g., elements, buttons, processing circuitry, media, memory, communication interface) overlapping with the other user interfaces are omitted and not unnecessarily repeated.

Tracking and Logging of Supervisor Activity

Figure 4A:
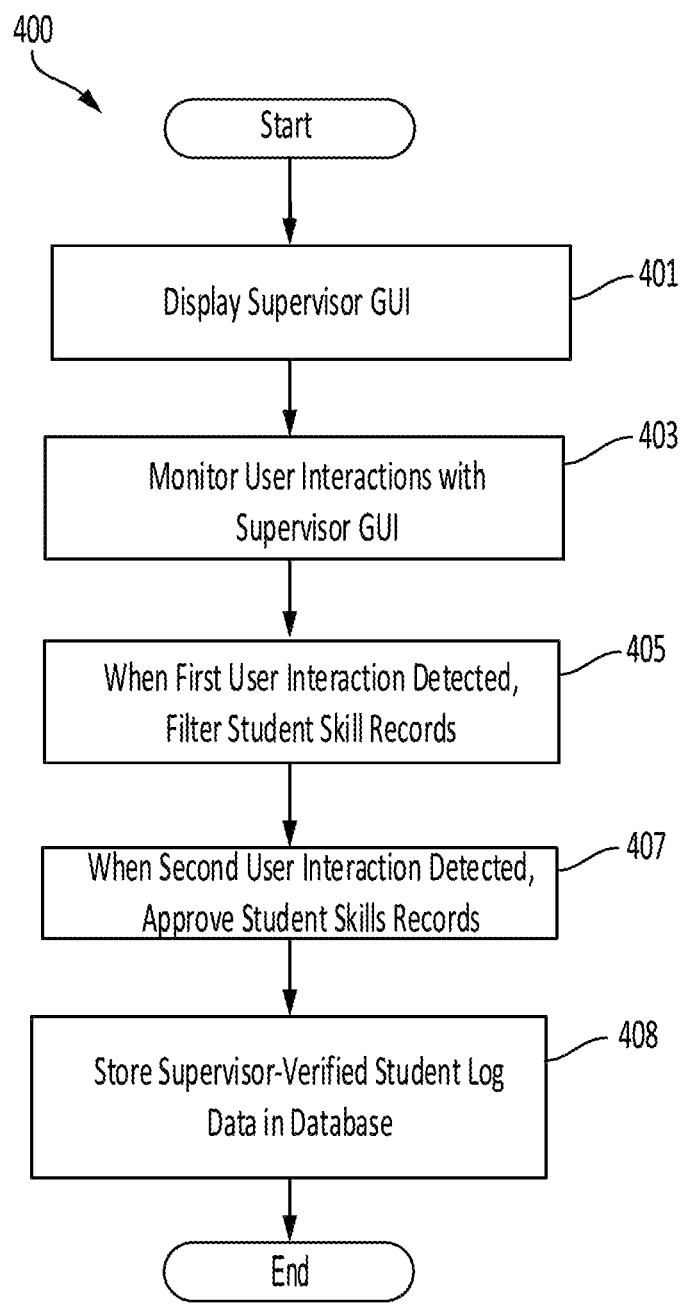
FIG. 4A illustrates a flow chart of a real time supervisor GUI method performed by processing circuitry, according to certain embodiments.

FIG. 4A illustrates a flow chart of a real time supervisor GUI method 400 performed by processing circuitry, according to certain embodiments. The tracking and logging of supervisor activity (Operation 204 of FIG. 2) may include one or more of operations 401-408 of the supervisor GUI method 400 of FIG. 4A. The supervisor GUI method 400 may include displaying, by a display of or coupled to an electronic computing device, a supervisor GUI on a display screen (Operation 401), monitoring user interactions with the supervisor GUI (Operation 403), when a first user interaction is detected, filtering student skill records and displaying the filtered skills records (Operation 405), when a second user interaction is detected, approving student skill records (Operation 407), and storing the supervisor-verified Student Log Data (i.e., the approved student skill records) in the database. The skill record may correspond to a student's self-reported skills, naming the supervising employee who was involved with them. The skill records can provide detailed skill information configured by the program.

Preceptors and admin can approve skill records, as well as editing them or adding new records. The skill records may correspond to or include time records. The skill records may correspond to a plurality of time records that are all related to the same skill or skills.

Figure 4B:
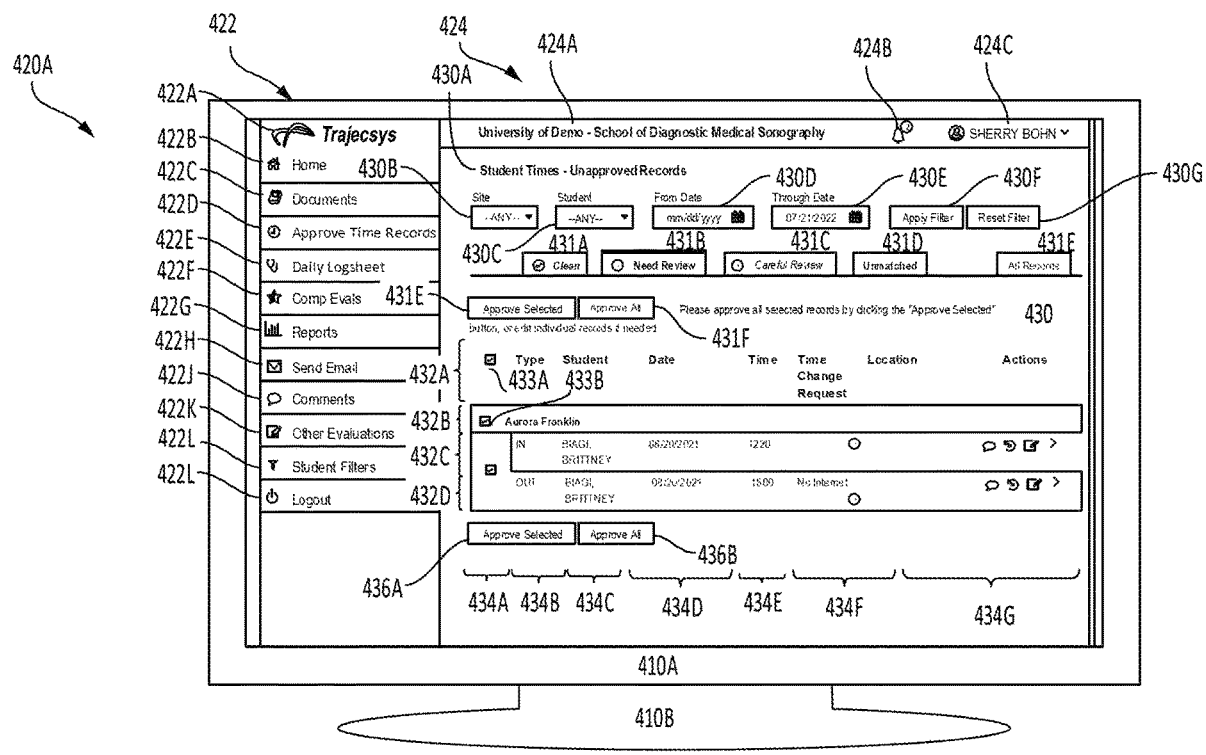
FIG. 4B illustrates an electronic display device displaying an example of a nested supervisor home GUI, according to certain embodiments.

FIG. 4B illustrates an electronic display device 410 displaying an example of a nested supervisor GUI 420A (e.g., a nested current supervisor home GUI 420A, which may be a time insights page), according to certain embodiments. The electronic display device 410 may include a computer monitor 410 having a display screen 410A and a monitor stand 410B. The electronic display device 410 may correspond to and/or be electronically coupled to the electronic computing device 150 and/or the server 180.

The nested supervisor GUI 420A may be displayed in Operation 401 but other GUIs (e.g., of FIG. 4C or 4D) may be displayed in Operation 401 as well. While the supervisor GUI is being displayed, user interactions with the supervisor GUI (e.g., clicking on a button) may be monitored/detected (Operation 402), and an action taken in response to the detected action, as explained below.

The nested supervisor GUI 420A may distribute student skill/time records (e.g., clock-in records, and corresponding/matching clock-out records associated with skills) based on, for example, a credulity algorithm. The nested supervisor GUI 420A may include a menu bar column 422, a header display area 424, and a dynamic display area 430, according to certain embodiments. The header display area 424 and the dynamic display area 430 may be displayed adjacent to the menu column 422 in the nested supervisor GUI 420A.

The menu bar column 422 may include the same or different features as menu bar column 322. The menu bar column may include a static text field 422A statically displaying a company logo, and interactable hyperlinked buttons 422B-322L. The interactable buttons 422B-322L may be text or icon buttons and display certain types of information and/or different GUIs based on (e.g., in response to) user interaction with the button. The buttons may be hyperlinked to other webpages/GUI screens and transition between webpage/GUI screens, such as the GUI screens and sub screens described herein.

The home button 422B may cause the nested supervisor GUI 420A to be displayed and/or to refresh when interacted with. In certain embodiments, a different home screen is used (e.g., a home screen having an announcements display area like in FIG. 3B). The documents button 422C may operate similar to the previously shown documents button (e.g., it may provide a Covid agreement form).

The approve time records button 422D may cause the nested supervisor "records approval" GUI 420A to be displayed and/or refreshed. The GUI 420A may also be referred to as a time approval page. The daily log sheet button 422E may cause a daily log sheet GUI to be displayed, such as daily log sheet GUI 420B of FIG. 4C, when interacted with. The comp evals button 422F may cause supervisor evaluations (e.g., online surveys) of the current program (e.g., the School of Diagnostic Medical Sonography program at the University of Demo) to be displayed when interacted with.

The reports button 422G may cause supervisor reports to be displayed when interacted with. For example, the supervisor reports may include a menu of a list of reports and/or a single default report. The supervisor reports may include one or more of the following reports: Time Totals, Skill Summary, Completed Comp Exams, Evaluation Summaries, Completed Evaluations, Ready to Comp, and Pathologies. The Completed Comp Exams, Evaluation Summaries, Completed Evaluations, Ready to Comp Comps and Pathologies may correspond to the reports discussed in FIG. 7. Below. The Time Totals report may correspond to a report of total amount of time under supervision (e.g., for a clinical trial session(s)) for each student under supervision. The supervisor reports may include a subset of the total reports, and the total set of reports may be viewable by the highest tier institution users (e.g., the administrator, the Dean, etc.).

The comments button 422J when interacted with, may cause a supervisor comments GUI to be displayed. The supervisor comments GUI may include a user input text field and a submission button so that the logged in supervisor may leave comments regarding the program and/or student. The student filters button 422L may cause a student filters GUI to be displayed, such as the student filters GUI 420C in FIG. 4D.

The header 424 may include logged-in program information 424A, a bell icon 424B and a logged-in user button 424C. The logged-in program information 424A (e.g., corresponding to a program identifier) may correspond to a current program (e.g., current program identifier) that the logged-in user (e.g., the logged-in supervisor) is associated with in the database. The bell icon 424B may be an icon that provides alerts for notifications and a count of the number of alerts and/or notifications (and may be similar as the previously discussed bell icon but directed at the supervisor and vice versa). For example, the bell icon 424B may display a count of supervisor alerts and/or notifications, which can be any form of alert, and related to any part of the application. The alerts and/or notifications may be related to any module in the system (e.g., pending "Ready to Comp", overdue evaluations, and/or unapproved time records).

The dynamic display area 430 may include one or more display areas. For example, the dynamic display area 430 may include an approve time records display sub screen 430. The approve time records sub screen 430 may include filter GUI functionality and provide an interface for the logged-in supervisor (e.g., as identified in 424C) to approve student time records (e.g., where the system stores, in the database, an indication that a student time record is approved by the appropriate supervisor). The time records sub screen 430 may include a title (sub-header) 430A, such as "Student Times-Unapproved Records", multiple user filter input menus 430B-430E, and multiple filter action buttons 430F, 430G. For example, first filter input menu 430B may be a site drop-down menu, second filter input menu 430C may be a student drop-down menu, third filter input menu 430D and fourth filter input menu 430E may include calendar date input menu components to provide a "From Date" and "Through Date", respectively. First filter button 430F and second filter button 430G may provide the ability to apply the filter (e.g., any inputs into the filter input menus 430B-430E may be used to search for records and remove any records that do not meet the filter requirements, and the found records/results may be displayed in the dynamic records display area 432) and reset the filter (e.g., clear all of the inputs in filter inputs 430B-430E), respectively.

Below the filter input menus 430B-430E may be a record tabs display area 431 with records tab buttons 431A, 431B, 431C, 431D and 431E. The record tab buttons 431A-431E may change the student records (e.g., matching student records) displayed in the dynamic records display area 432

(e.g., including record 432A-432B) based on which category the student time record lands under, thereby acting as filters filtering in/out records in the dynamic records display area 432. For example, the record tab display area 431 may include a clean records tab 431A (e.g., only shows clean/normal matching student time records that do not need review), a need review tab 431B (e.g., filters in only and all matching student time records needing supervisor review), a careful review tab 431C (e.g., filter in only matching student time records needing careful review, such as because of a detected anomalous event (e.g., a time exception or a detected pattern of time exception student records)). The unmatched record tab 431D may display student time records that are not matched (e.g., a list of time records where the student never matched an OUT record to their IN record). According to an embodiment, on each tab (except "Unmatched"), the supervisor user can edit or approve a single matched student time record, or approve all of matched student time records at once.

The approve selected button 431E and the approve all button 431F may approve the respective time entries (the button 431E may approve the selected (with checkbox 433B selected) time entries and the button 431F may approve all time entries, and/or all time entries under the current selected tab). The checkbox 433A may be used to select all time records (e.g., when checkbox 433A is selected by a user clicking in the checkbox 433A, all checkboxes (e.g., checkbox 433B) are selected in response.

The display area 432 may include a header row 432A that identifies the name of each column (e.g., the checkbox column 434A is indicated by a checkbox, the type column 434B indicates "Type" of clock/time transaction (e.g., in or out), the 434C student column recites "Student" and indicates a column in the matching time record for a student's name, the date column 434D recites "Date" and indicates a column in the matching student time record for a date of the individual time transactions, the time column 434E recites "Time" and indicates a column in the record for a time of the time/clock in/out transaction, the time change request column 434F indicates whether there was a time exception or change, and if so, a reason (e.g., No Internet), and recites "Time Change Request" and, the location column may indicate a location (e.g., a stie), and the actions column 434G may provide various actions that the user may take, such as a comments icon (to add comments to the record), a view history icon (shown in FIG. 4B as a clock face with a counter-clockwise arrow to view the history of the student record), an edit record icon (to edit the student record) and an arrow icon (for more icons to be displayed).

The student record may be a nested student record that is organized/grouped by site name 432B (e.g., "Aurora Franklin"), and one or more matching student time records under the site name 432B. A matching student time record may include a clock-in transaction 432C and a clock-out transaction 432D. The student time entry 432C is a clock-in entry and the student time entry 432D is a clock-out time entry/action.

The displayed data and/or alerts, reminders and announcements may change based on changes/updates to the database made by, for example, other users associated with the program, and the student's participation in the program. The dynamic display area 430 may dynamically change what is displayed (in real time or near real time) based on user actions in other areas of the nested student home screen 420A, such as user actions/interactions with buttons in the column menu bar 422.

Figure 4C:
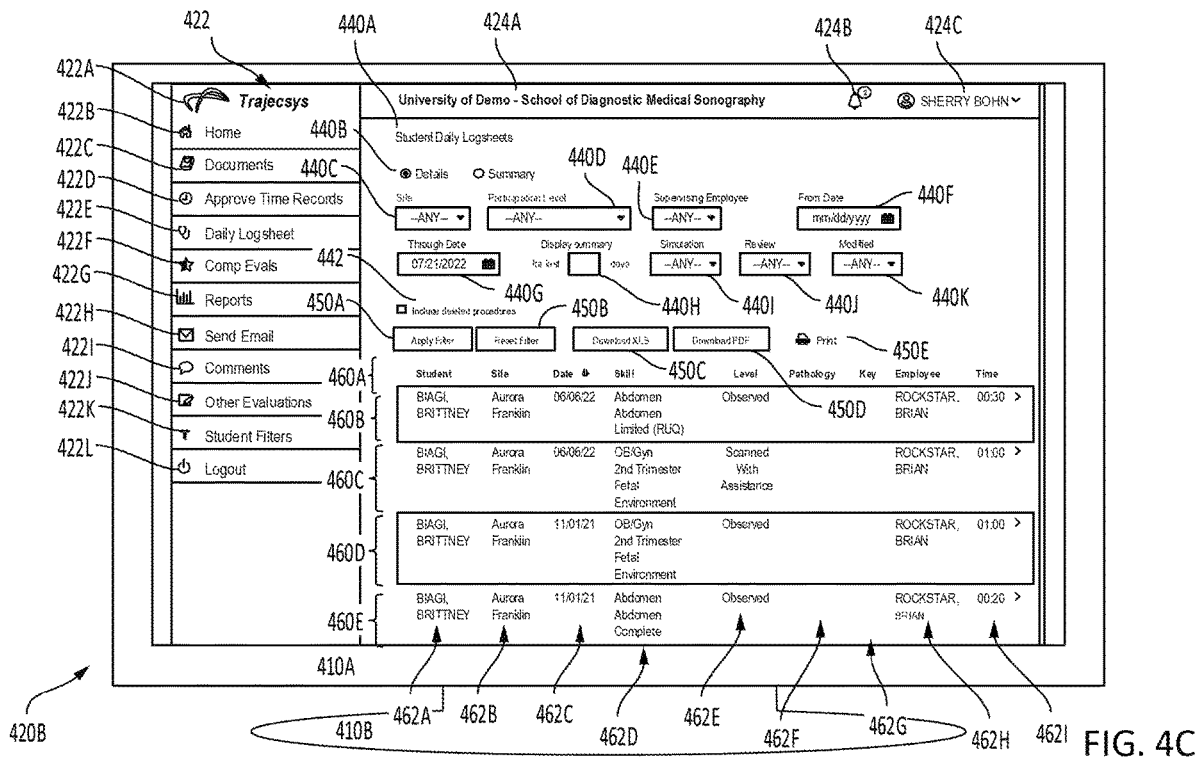
FIG. 4C illustrates an electronic display device displaying an example of a nested supervisor GUI with daily log sheet display areas, according to certain embodiments.

FIG. 4C illustrates an electronic display device 410 displaying an example of a nested supervisor GUI 420B with daily log sheet display areas 440, 450 and 460, according to certain embodiments. The first daily log sheet display area 440 of the nested supervisor GUI 420B includes a title/header 440A (e.g., "Student Daily Log sheets"), a details/summary toggle button 440B, a stie drop-down menu 440C, a participation level drop-down menu 440D, a supervising employee 440E, a from date calendar menu 440F, a through date calendar menu 440G, recent number of days input box 440H, a simulation drop-down menu 440I, a review drop-down menu 440J, and a modified drop-down menu 440K. Each of the buttons/menus 440B-440K of the first daily log sheet display area 440 may correspond to filters that a user (e.g., supervisor) can choose to activate.

The second daily log sheet display area 450 may include action buttons including an apply filter button 450A, a reset filter button 450B, a download XLS button 450C and a download PDF button 450D. GUI 420B shows a daily log sheets review page, which allows supervisors to view student skill reports and approve/reject them. The apply filter button 450A may cause the third display area 460 to change the student records that are displayed based on the filters corresponding to the buttons/menus 440B-440K (in the Details mode) and change the student records used for the summary when in the Summary mode. The apply filter button 450A may correspond to the first user interaction with the supervisor GUI in Operation 405.

When the details/summary toggle button 440B is interacted with, the Summary Mode may be activated where the student records are aggregated by student instead of in details. FIG. 4C shows the Details Mode at button 440B but by clicking on Summary at 440B, the mode may be switched to the Summary Mode.

Row 460A may include column headers and student skill records 460B-460E. Each student skill record 460B-460E may include a student name 462A, a stie 462B, a date 462C, a skill category or type 462D, a skill level 462E, a pathology 462F, a key 462G, an Employee 462H, and a time duration 462I. According to an embodiment, when one of the log sheets 460B-460E are clicked on, a view with more details (along with any signature) is displayed and the supervisor is presented with a display interface to approve the log sheet/skill record. When a user interaction corresponding to approval is received, the skill record may be indicated as approved (Operation 407) and the database updated so as to store supervisor-verified student log data in the database (Operation 408). Log sheet and student skill record may be used interchangeably and may correspond to a student time record.

Figure 4D:
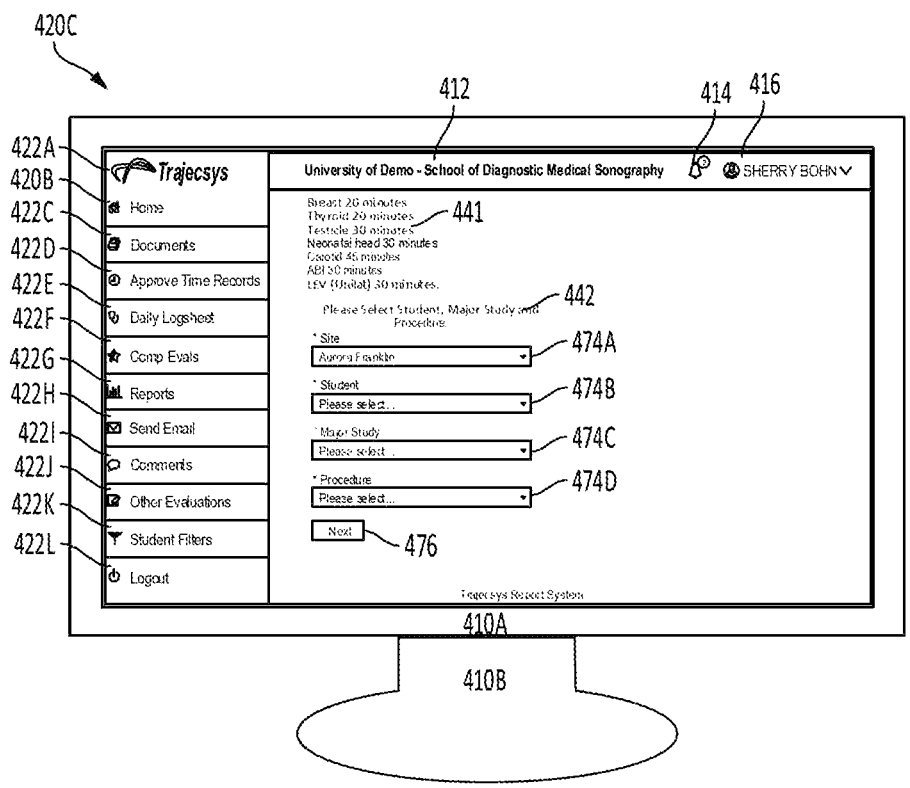
FIG. 4D illustrates an electronic display device displaying an example of a nested supervisor GUI with a comp evals screen, according to certain embodiments.

FIG. 4D illustrates an electronic display device 410 displaying an example of a nested supervisor GUI 420C with a comp evals screen 440, according to certain embodiments. The nested supervisor GUI 420C includes durations of specific body part evals 441, instructions 442 (e.g., "Please Select Student, Major Study and Procedure"), site drop-down input menu 474A, student drop-down input menu 474B, major study drop-down input menu 474C, procedure drop-down input menu 474D, and next button 476. Each of the drop-down input menus may allow a logged-in supervisor to select criteria, and begin an online evaluation of a program component (e.g., an exam) after interacting with the next button 476. The durations of evals 441 may correspond to a list of different types of evals and the expected amount of time needed to complete the eval. The next page displayed after the next button 476 is interacted with is the online evaluation itself. The online evaluation may be programmatically different from a regular evaluation (e.g., as shown in FIG. 3C) but it may be visually the same or similar. The online evaluation programs describe competency evaluation questions on a per-skill basis.

Operations 202 and 204 may collectively be referred to as collecting and building a database of supervisor-verified student log data.

Figure 5A:
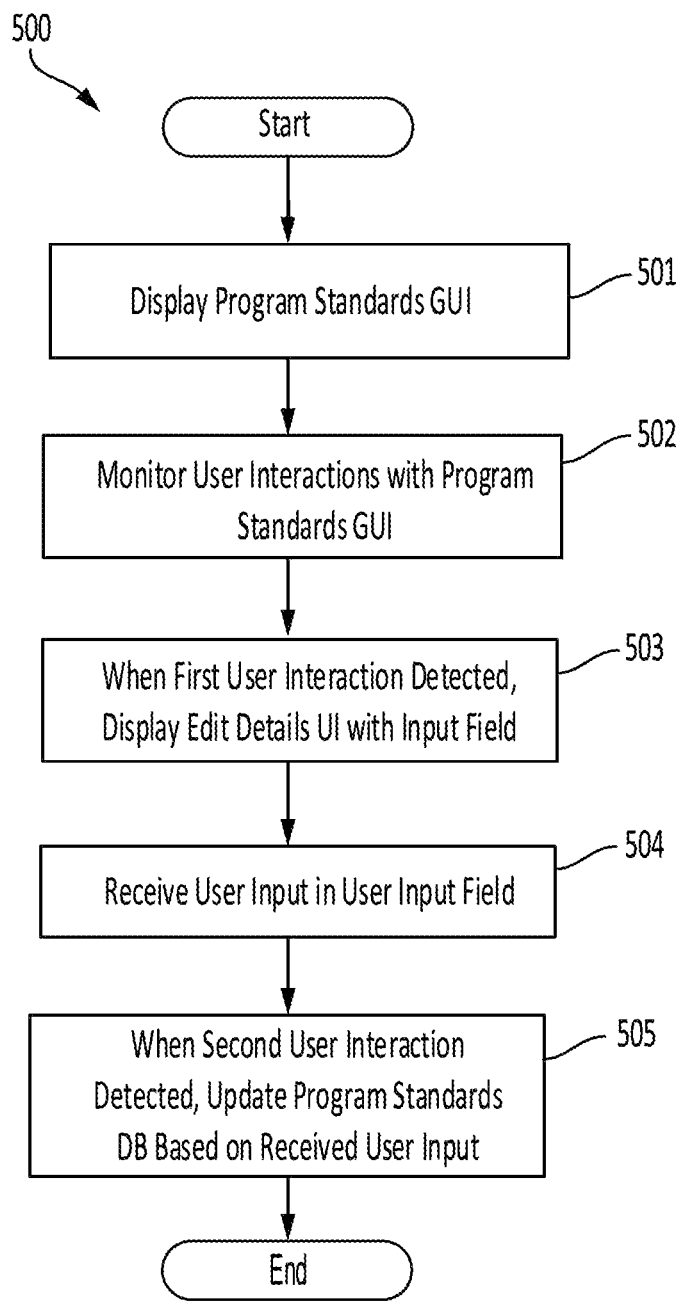
FIG. 5A illustrates a flow chart of real time program standards GUI method performed by processing circuitry, according to certain embodiments.

For the displaying of the nested program standards GUI (Operation 206), the real time program standards method 500 of FIG. 5A may be performed. With reference to FIG. 5A, according to an embodiment, the processing circuitry may perform a real time program standards method 500. The real time program standards method 500 may include Operations 501-505.

Operation 501 may include displaying, on a display screen of an electronic computing device (e.g., an electronic display device), a nest real time program standards GUI. The nested real time program standards GUI may include display of various standards information, and standards criterion associated with the logged in user (e.g., an institution user, such as a program administrator, or department user) for real time analysis and evaluation within a nested menu interface.

The displaying of the program standards GUI may include displaying a program standards GUI that was generated based on program standards GUI information received from a server. The program standards GUI displayed in Operation 501 may correspond to or include any of the GUIs and/or sub screens illustrated in FIGS. 5B-5D, 6A-6C, 7 and 8. While the program standards GUI is being displayed, user interactions with the program standards GUI (e.g., clicking on a button) may be monitored/detected (Operation 502), and an action taken in response to the detected action, as explained below.

Nested Real Time Program Standards GUIs

Figure 5B:
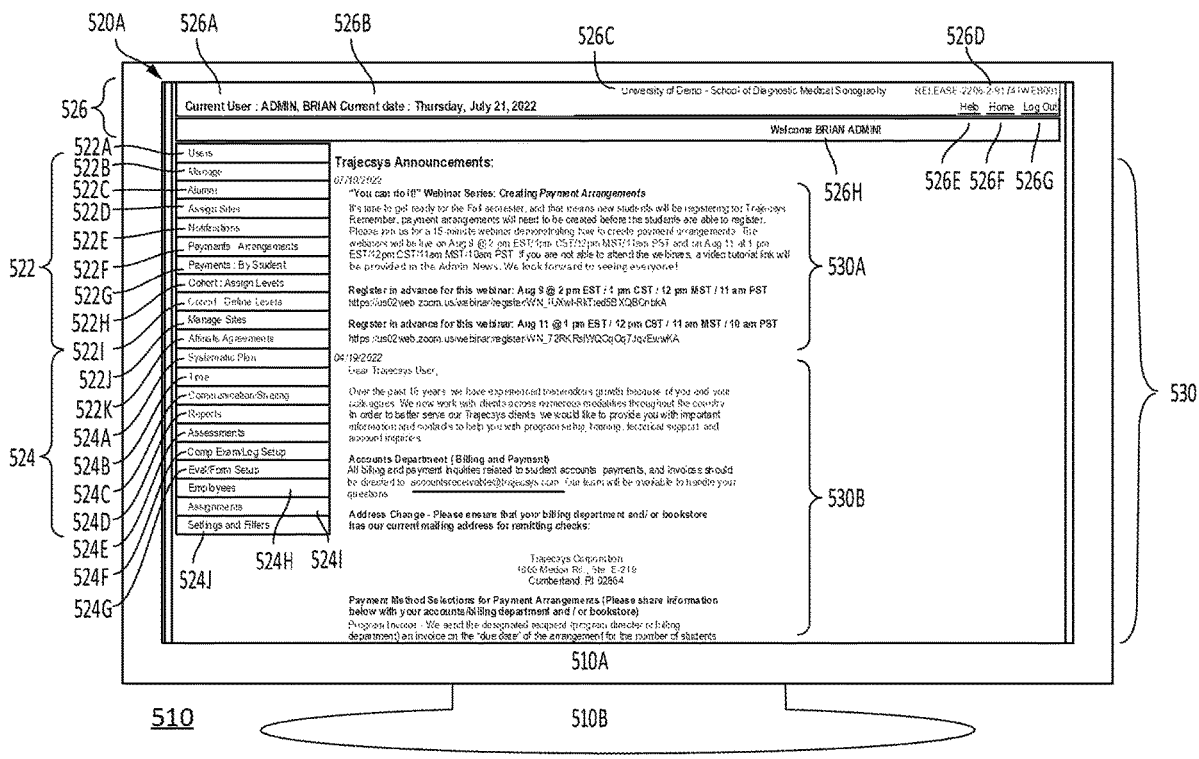
FIG. 5B illustrates an electronic display device displaying a nested program standards user interface including an announcements sub screen, according to an embodiment.
Figure 5C:
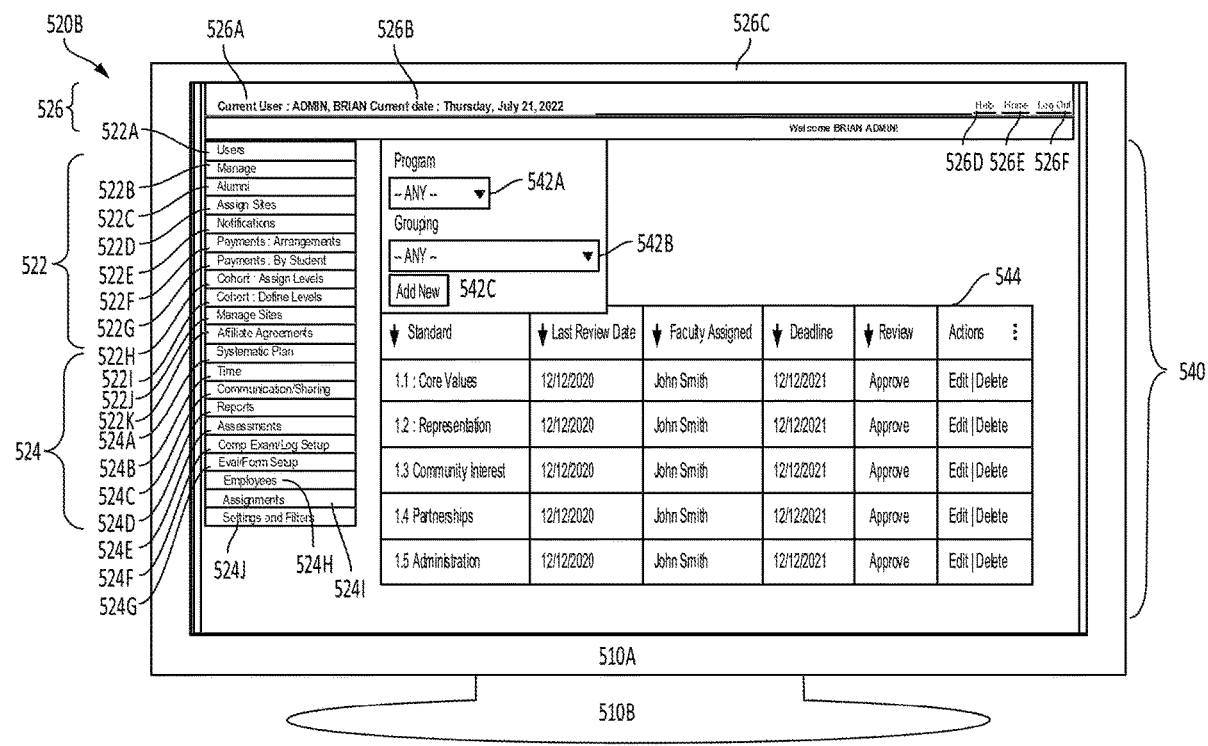
FIG. 5C illustrates an electronic display device displaying a systematic plan of evaluation (SPE) subs-screen nested in a real time program standards GUI, according to an embodiment of the disclosure.
Figure 5D:
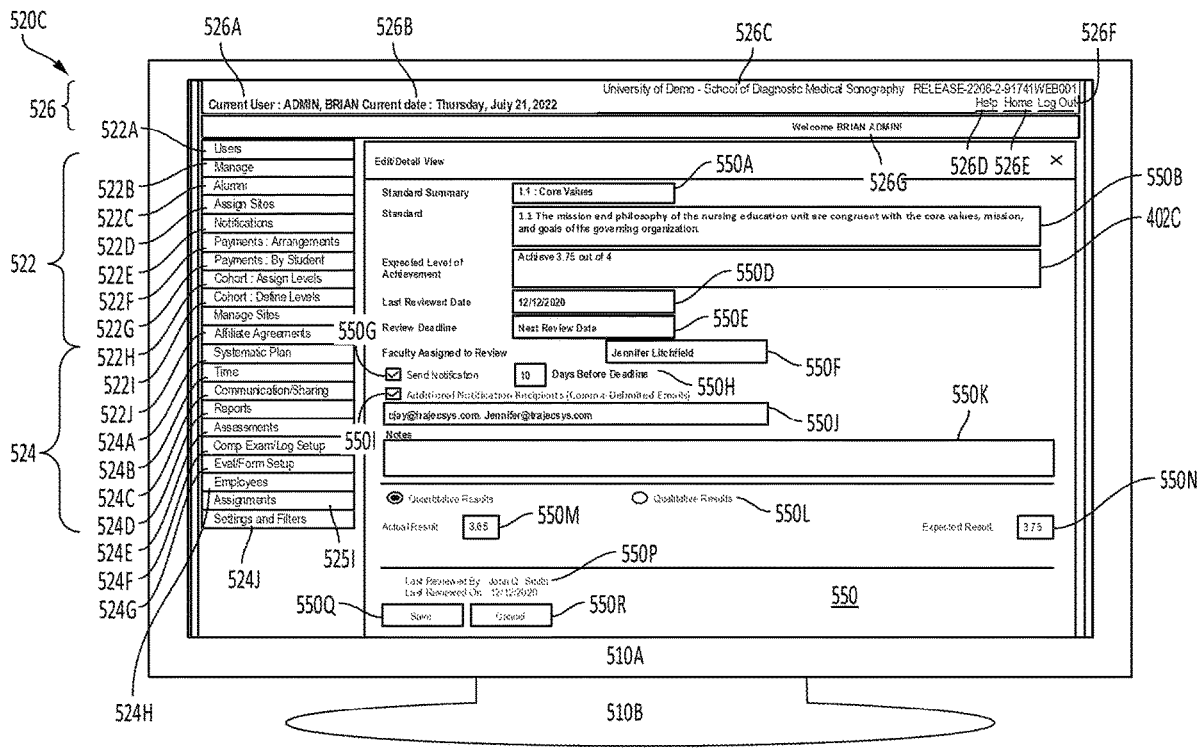
FIGS. 5D and 5E illustrate an electronic display device displaying an edit program details sub screen(s) nested in a standards GUI, according to an embodiment of the disclosure.

FIGS. 5B-D provide at least a part of a real time standards program GUI application with various nested GUIs (and sub screens that can be displayed in an inner (nested) display area of the nested GUIs). FIG. 5B illustrates an electronic display device 510 displaying a nested program standards user interface 520A (e.g., for a program leader user account) including an announcements sub screen 530, according to an embodiment. The electronic display device may be a computer monitor 510 having a display screen 510A and a monitor stand 510B.

Each of the computer monitors may be or electronically coupled, wired or wirelessly, to a networked electronic computing device. The electronic display device 510 may correspond to and/or be electronically coupled to the electronic computing device 150 and/or the server 180. The display screen 510A may display a nested program standards GUI screen 520A. The nested GUI screen 520A may be a home screen that includes an upper left column/stacked administrative menu 522, a lower left column/stacked program standards ("Systematic Plan") menu 524, a header (status/information) bar 526, and a dynamic display area 530 having one or more display sections 530A, 530B. The upper left column/stacked administrative menu 522 includes menu buttons 522A-522K. The lower left column/stacked menu 524 includes sub-menu buttons 524A-524J.

The dynamic display area 530 may change what sub screen and/or information is displayed based on real time updates to the database and/or user actions/interactions in other areas of the nested home screen 520A, such as interactions in/with static (or semi-static) areas (e.g., menus 522 and 524 and header 526). For example, when one of the buttons 522B-522K and/or the buttons 524B-524J are interacted with, such as by being clicked on, the dynamic display area 530 may change.

Menu buttons 522A-522K and 524A-524J are menu links to other pages of the supervisor application (e.g., when clicked on, the dynamic display area changes to a different sub screen). When the Affiliate Agreements button 522K is clicked on, the Administrators may create and manage affiliate agreements, which show valid contracts between programs and sites.

For example, when the Systemic Plan menu button 524A is clicked on, the standards sub screen 600A (of FIG. 6A) may be displayed in the dynamic display area 530, while the other portions of the GUI 520A may remain the same (or for example, the time/date 526B may update normally with the remaining portions of GUI areas 522, 524 and 526 remaining the same or similar. An example of a program standards GUI 520B with the standards sub screen 540 is shown in FIG. 5C, and the standards sub screen example is shown in FIG. 6A. The buttons (or a group/subset of buttons) may be collapsible/expandable, such that certain buttons are hidden when the buttons are collapsed and displayed when the buttons (or a group of buttons) are expanded. The gear icon 606 may be used to change the layout of the display sub screen 644A (e.g., change what columns are displayed; and add/remove columns to be displayed, which may be useful for the mobile version).

Remaining the same, static, or semi-static may mean remaining substantially the same where normal updates are still applied (e.g., date/time is updated, alerts/notifications are displayed, sub-menus may collapse/expand based on user input). Tapped or selected may correspond to tapped in this disclosure. Tapped is an example of the GUI element (e.g., button, checkbox, etc.) being interacted with but other user interactions (e.g., selecting, long pressing) may be used, according to various embodiments.

Announcements areas 530A and 530B show announcements that may have been entered by various user computing devices. According to an embodiment, coordinators and higher can fill out any announcements for users except the announcements 530A, 530B displayed in the GUI of FIG. 5B. The announcements 530A, 530B may be entered by the server staff (e.g., Trajecsys staff) to inform institutional users (e.g., program faculty) of company news (e.g., Webinars related to the software program). The institutional users may log-in as a program to have a programmatic level view of the data in the database (as opposed to a student only level view the student has). That is, when the user logs in, information regarding a specific program is displayed, and the user's login credentials are associated with a program identifier, which is stored in the database.

The program standards GUI may remain displayed until a user interaction occurs (e.g., a button tapped or clicked, an ESC key hit, etc.) and/or until a predetermined period of time has elapsed. A program standards GUI, at that time, may be replaced by a different program standards GUI and/or a new sub screen within the nested program standards GUI. Using the nested program standards GUI (e.g., with a fixed area including a menu that does not change (or only performs normal updates) provides a friendly user experience that is seamless across different display sub screens. In Operation 502, the electronic display device and/or server may monitor user interactions with the program standards GUI. The user interactions (e.g., for any displayed GUI) may correspond to any interaction a user may take in relation to the displayed GUI. The interactions may include but are not limited to a user tapping a touch screen panel of the electronic display device (e.g., at a location corresponding to a button or drop-down menu), a user clicking on the button or drop-down menu (e.g., via a mouse), a voice command, a gesture command, a keyboard command, or a combination thereof.

Systematic Plan of Evaluation

FIG. 5C illustrates an electronic display device 510 displaying a systematic plan of evaluation (SPE) sub screen 540 (i.e., a program standards GUI sub screen) nested in a real time program standards GUI 520B (i.e., a program standards nested GUI), according to an embodiment of the disclosure. SPE may correspond to a program plan of outcomes and evaluations (e.g., program outcomes not individual student outcomes). The SPE sub screen 540 may correspond to a systematic plan of standards compliance, such as for accreditation standards, according to certain embodiments. The logged-in user of the SPE may correspond to a program leader, or faculty members assigned to a particular program (a single program or multiple programs only SPE).

The SPE sub screen 540 may include a program drop-down menu 542A, a grouping drop-down menu 542B, an "Add New" button 542C, and a standards status table 544. The program drop-down menu 542A provides an interface for a logged-in user (e.g., an institutional user) to select a program. For example, if there are multiple agencies that the user is trying to pull the data for, whether it be a State Board of nursing or a national accrediting agency, they may have different requirements, so this will provide a GUI One that defaults to one particular report, for which may be the only one they are measuring. If there is another report that needs to be run, they may run a second report (e.g., they have a state board of nursing and a regional accreditor that have different requirements), and the drop-down menu 542A and/or 542B may take him to a separate different GUI/report page, but based on the same information.

The groupings drop-down menu 542B includes groupings which may mean grouping cohorts from multiple years into a single report to meet a compliance standard, according to an embodiment. According to an embodiment, groupings means allowing each standard to be grouped into a single report to compare outcomes to the compliance standard. The groupings provide categorization and separation of the accreditation/program but may come in a different form (e.g., an areas menu instead of groupings, which is tied to geographic areas, breakdown by state).

The add new button 542C, when interacted with, may cause a pop-up window or sub screen to display a new copy of a program standards GUI 520B with the standards sub screen 540 is shown in FIG. 5C, to add a new Standard (e.g., a standard criterion of a program) into the institution's Systematic Plan (e.g., the systematic plan for the program associated with the institution associated with the logged in user (e.g., "Brian Admin")) in the database. The standards status table 544 is explained below with reference to FIGS. 6A and 6B.

FIG. 5D illustrates an electronic display device 510 displaying an edit program details sub screen 550 nested in a program standards GUI 520C, according to an embodiment of the disclosure. The edit sub screen 550 includes GUI elements 550A-550R.

Text input field 550A and text input field 550B correspond to editable standards information (550A is the editable Standard Summary (e.g., the standard criterion item name), and 55B is an editable description of the standard (e.g., a description of the standard criterion)).

The last reviewed date 550D shows a date (e.g., "12/12/2020") that the individual program standard (e.g., "1.1 Core Values") was last reviewed. Last reviewed may mean the last time the Edit/Detail View screen was viewed for the particular standard criterion. The review deadline 550E may include a date (e.g., "12/20/2022") or "Next Review Date" when no entry has been made yet. The review deadline 550E may be stored in the database with the program standard criterion.

The faculty assigned to review text input field 550F may correspond to a name or email address of a faculty member (e.g., a faculty account user in the database) that is responsible for reviewing the standard of the standard summary input field 550A. The checkbox 550G may toggle whether a reminder notification is to be sent to the Faculty Assigned to Review, and the days before deadline input field 550H indicates the number of days prior to the review deadline 550E that a reminder notification will be sent to the faculty assigned to review 550F (e.g., Jennifer Litchfield, and sent to Jennifer Litchfield's email address). The checkbox 550I toggles between whether additional notification recipients (e.g., besides the Faculty Assigned to Review 550F) will receive the reminder notification or not. When the additional notification checkbox 550I is checked (as shown in FIG. 5D), the comma-delimited emails in the text input box 550J (e.g., "cjay@trajecsys.com, Jeffiner@trajecsys.com") will also be used for forwarding the reminder notification to at the same time as the reminder notification email to the faculty assigned to review and/or any other email alerts (which may correspond to the live GUI alerts). The comma-delimited emails in the text input box 550J may include everybody who needs to know about that standard coming to review or everybody who needs to know that that standard failed or succeeded (the standard failing or succeeding may be on an item basis and generate a per item alert as shown in the GUIs). For just the individual standard criterion ("core values"), a specific faculty member may be assigned, a specific set of email recipients because there may be some standards the dean of the school cares about more and may be they can be email recipients on those but then there's some that only the program dean really cares about and some that the program always succeeds on that that only the faculty members assigned care about, which can all be customized through this interface with granular personalization/customization.

The notes input field 550K may be used by the logged in user to add comments/notes regarding the individual program standard.

The Expected Level of Achievement (ELA) 550C is entered by the user and may be indicated as quantitative or qualitative by radio buttons 550L. The ELA 550C may correspond to expectations for the standard, which may be categorized as qualitative or quantitative, for each of the criterion. Quantitative and Qualitative may not be part of the standard itself but additional information regarding the standard. According to an embodiment, the standards information corresponds to text input fields 550A and 550B. According to an embodiment, the remaining GUI elements of FIG. 5D beyond the text input fields 550A and 550B are the Program Standards Application's response to the input fields 550A and 550B. According to an embodiment, the ELA 550C and quantitative/qualitative result method 550L might be explicitly driven by the standard itself. Qualitative feedback may be required by the accreditor and may be a qualitative outcome assessment. According to an embodiment, a user can modify the ELA column.

The GUI 520C may also include an actual result 550M compared to an expected result 550N, when operating in the quantitative results method 550L, as shown in FIG. 5D. FIG. 5D is a quantitative sub screen. The quantitative ELA may include, for example, a point sum, a point average (e.g., a GPA, such as 3.65), or whatever rubric an accrediting agency is requiring. For example, the expected result of the quantitative ELA may indicate whether a student is meeting benchmarks (e.g., minimum on an exam is an expected result, according to an embodiment).

Additional historical review information 550P may be displayed in the GUI 520C. The GUI 520C may also include a save button 550Q and a cancel button 550R. The save button may update the database based on the changes made with the GUI elements 550, and the cancel button 550R may discard the changes and return to the previous screen/sub screen (the cancel button 550R may include a confirmation to confirm changes will be lost).

While monitoring the user interactions, the interactions with a displayed GUI may trigger further display operations. For example, Operation 503 may include detecting a first user interaction (e.g., a tap or click of a button corresponding to an Edit Details View GUI, such as button 626A in FIG. 6A), and when (or in response to, or based on) the first user interaction, the electronic display device may display an Edit Details GUI 520C, which may include user input fields 550A-550K. The Edit Details GUI may correspond to the Edit Details GUI 520C of FIG. 5D. In Operation 504, while the Edit Details GUI is being displayed with a user input field, the electronic display device may receive a user input into the user input field. For example, the user may add text to change a name and description of the individual program standard/criterion in input fields 550A and 550B. The receiving of the user input may include displaying the user input in the user input field after the user has input the user input, and updating the program standard criterion information in the database. The user input may be input by way of a mouse, touch, a real or virtual keyboard, a gesture, a voice command or the like.

In Operation 505, when a second user interaction is detected (e.g., a click or tap of the save button 550Q), the electronic display device may control the network communication interface to transmit update information to the server, which may cause the server to update its own database in a memory (e.g., a database storing standards compliance information associated with the institution and/or logged in user). The update information may correspond to the received user input information and may also include identification of the input field the information was received in, and identification information corresponding to the standard (e.g., a standards criterion identifier or a program standards identifier with the criterion name). According to an embodiment, a user can upload essential evidence to present to the board of nursing and national accreditors.

Figure 5E:
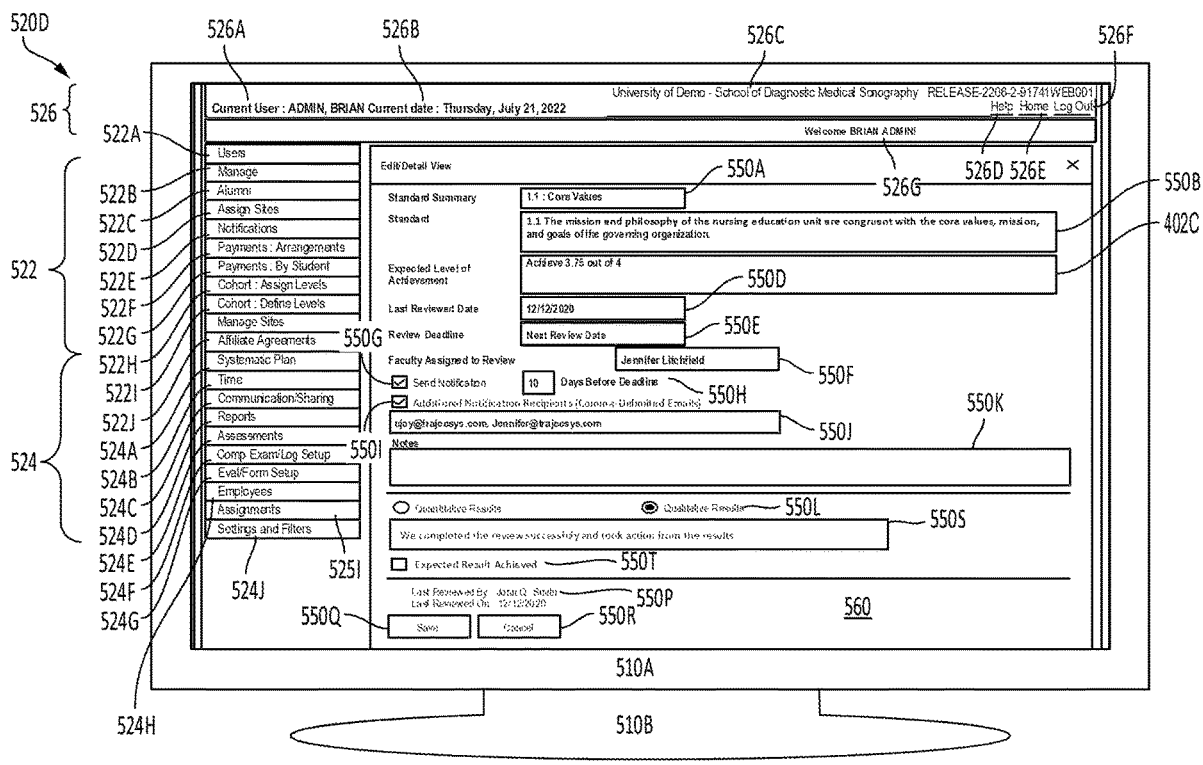

FIG. 5E illustrates an electronic display device 510 displaying an edit program details sub screen 560 nested in a program standards GUI 520D with qualitative results, according to an embodiment of the disclosure. The GUI 520D is almost identical to the GUI 520C but the qualitative/quantitative toggle button 550L has been changed to show the GUI in qualitative mode. Instead of the quantitative GUI elements 550M and 550N of FIG. 5D, FIG. 5E shows qualitative GUI elements 550S and 550T. The qualitative results sub screen 560 may include an additional text input field 550S for explaining why the standard has been met, and a check box 550T for indicating whether a qualitative expected level of achievement has been achieved. The qualitative information of 550S and 550T may be quantized to provide a quantitative score for the qualitative information.

According to an embodiment, when the student is on a mobile device, a GPS pin may be used that indicates the student record was made when the student was on site or not on site. When the student is on site, the record for the supervisor's approval may be indicated as a normal record, whereas a record for the supervisor's approval when the student is not on site may be marked as abnormal (e.g., marked with a flag/alert). The normal records may have a faster path for approval by the supervisor. Green may correspond to most reliable record meaning nothing abnormal (e.g., on-site time entries using clock-in/clock-out functionality of student website/app). Needs review (or yellow) may mean there may be smaller issues (e.g., student had to enter time record after the fact because had no Internet or forgot; or within a certain range of the site but not on the site). Careful review (or red) means a larger issue (really bad potential issue), student way off from the site (e.g., should be in Florida but in New York; or all records were made-up meaning did not clock-in on time or clock-out on time, such as forgetting both times). The approve all button approves all the normal/green records (fast track approval), according to an embodiment. Other users can see real time updates within a nanosecond.

According to an embodiment, qualitative responses may be obtained and then quantified. For example, when the qualitative answer includes positive terms (e.g., good, great), a quantitative score of 5 (out of 5) may be given. If the answer is mediocre (e.g., satisfactory, average), a score of 3 out of 5 may be given, and if the answer is negative (e.g., bad, not good), a score of 1 or 0 may be given as a quantified score for a qualitative outcome. For example, when the student goes out and performs a clerkship or internship, someone supervises the student to make sure they understand the textbook materials and/or how to do the job, which is a qualitative (subjective) outcome. By quantifying the qualitative evaluations, everybody in that class or cohort, can be measured by the subjective answers/reviews from the supervisor and/or the instructor. The quantification of the qualitative answers provides a measure across all students for a particular item. Based on this operation, an analysis may be provided that explains, for example, everybody in a group had a qualitative result of 4.5, how many students were above 4.5, and wow many were below.

In comparison, a quantitative score could be based on exam answers and/or GPA. By notifying/alerting the institutional users of any undesirable situations (e.g., 90% of students have a low quantitative score, such as 1 or less (on a scale of 5), or most student averaged a 1.5 when expected them to average a 3), the institution may provide remediation (e.g., immediate reteaching) in real time (e.g., without waiting for an annual review, or waiting for an adverse action from an accreditation agency). According to an embodiment, real time data on any deficiencies on any standard may be accessed at any time, and the right people may get notifications that the students are going in the wrong direction towards compliance with an organizational standard.

According to an embodiment, when a review is completed, and the expected result failed (e.g., the ELA is not met), email notifications may be transmitted to everyone in the SPE list, where the notification indicates the expected result was not met/failed qualitative results. When the expectations have not been met, an alert may be fired to let everyone who is relevant know that you did or did not reach that qualitative expectation. The SPE list in this context may be locked, and may be different or the same as the list for the reminder emails.

The expected level of achievement, though, is what an institution intends to do to prove that they have hit a program standard. For example, a reasonable metric may be designed by an institution. For example, a 3.75 out of 4 average grade point average (GPA), which proves a certain level of skill. Thus, the average GPA or a reasonable pass rate, may be a standard set by the institution, and the actual result corresponds to an actual result (e.g., actual GPA) and that value is maintained in the database.

Figure 8:
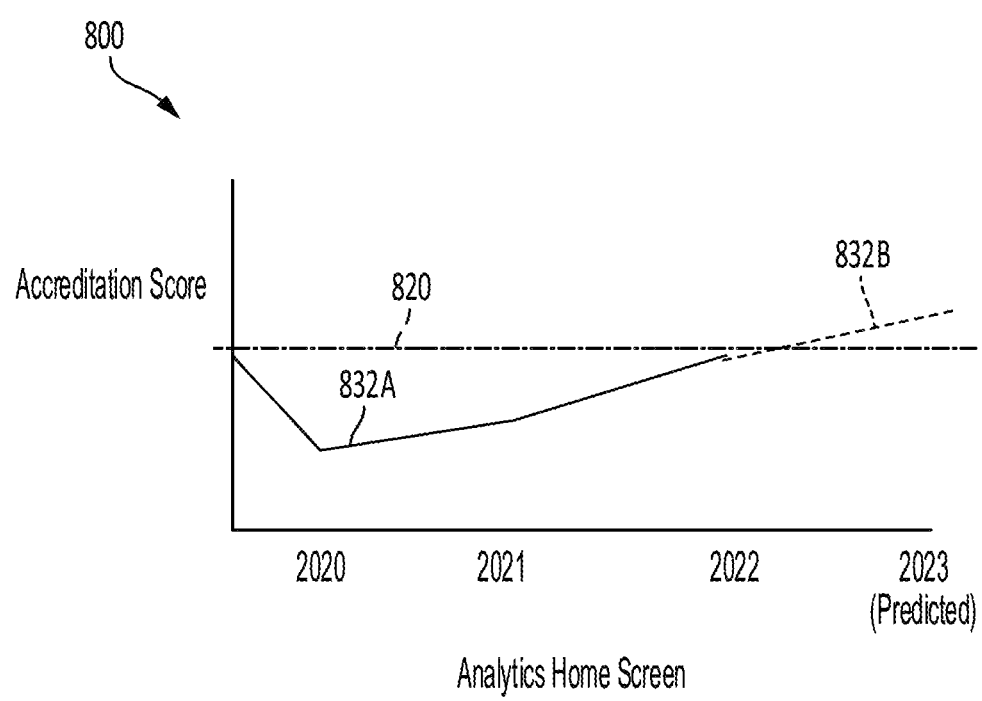
FIG. 8 illustrates a trends sub screen, according to certain embodiments.

As shown in FIG. 8, when the expected result (goal) is 3.75, a trend line upwards or downwards may be displayed to show a GPA trend and an ELA line 820. The FIG. 8 shows whether an average student is improving year over year or not improving year over year for that particular standard and/or standard component (e.g., average student GPA). FIG. 8 shows a three-year report and a predicted score but also could be modified by the user to change the date range (e.g., a 10-year report customized for individual accrediting agency, school and program).

FIGS. 6A and 6B illustrates a standards status table 644A, according to certain embodiments. FIG. 6A illustrates a standards status table 644A and FIG. 6B illustrates a standards table with real time alerts 644B. The standards status table 644A includes a column title row 602, and individual criterion rows 604 corresponding to individual criterion of program standards. The columns (e.g., a Standard Summary/Name column 612, a last review Date column 614, a faculty assigned name column 616, a deadline date column 618, a review status column 620, an actions column 622) may correspond to the data structure of each row/individual entry for the individual program criterion.

The review column 620 may display an indication of whether an individual (row) criterion has been reviewed. In this respect, the review column 620 may warn programs of unreviewed standards (e.g., by indicating "Approve" when unapproved, and "Approved" or "Submitted" after approval submitted). The "Approve" button or field may update to change the status after the approval has been authorized.[1] According to an embodiment, review column 620 may include a "Review" button, when eligible, to review the qualitative/quantitative results of a standard and/or approve. Column 620 may also contain an exclamation point warning for overdue review, as shown in the "1.4 Partnerships" row of FIG. 6A, as an example. Alternatively, that warning or flag may be displayed in the column 618. The warning may correspond to the exclamation point in the "1.4 Partnerships" row of FIG. 6A and/or the flag 642A, 642B of FIG. 6B. The warning or flag may be color coded, such as red (potential problem), yellow (caution, potential problem could occur in future), green (normal operation). The warnings may include flags displayed as discussed above as well as email alerts (e.g., to a SPE list of relevant users associated with the SPE and/or SPE standard).

[1] Is 620 of FIG. 6A what you mean by warning of unreviewed standards (Approve means unreviewed?)?

The GUIs corresponding to the standards status table 644A, 644B are user friendly and a user can easily enter and export accreditation data within the customizable SPE table. The GUIs corresponding to the standards status table 644A, 644B includes options (e.g., text input fields) for modifying review dates and which person(s) (e.g., nursing faculty, director, coordinator and/or nurse administrator) or email address are to be emailed reminder notifications (for when a standard review is approaching) and/or alerts of detected events (e.g., ELA not met, or negative trend for ELA). This feature ensures all are on the same page when a criterion is due, preventing a delay in review.

The GUI sub screens 644A, 644B provide one-click or two-click renewal of reviews (e.g., by clicking the "Approve" button or a "Review" button). The edit buttons 626A-626E may cause an edit details sub screen to be displayed (e.g., edit details sub screen 550 of FIG. 5D) for editing information in that row. The delete buttons 628A-628E may allow for individual (precise) deletion of the standard criterion.

The standards status table 644B includes real time alerts 640A-640C, 642A and 642B. The real time alerts 640A-640C may correspond to an indication the individual criterion (e.g., the respective row of the rows 604) being satisfactory (e.g., meets or exceeds a threshold or ELA, or satisfies a predetermined condition), and the real time alerts 642A and 642B may correspond to a warning or alert that the individual criterion (a single row of rows 604) needs to be reviewed. The warning or alert may be a flag or exclamation point (an example exclamation point icon is shown in FIG. 6A). According to an embodiment, instead of exceeding a threshold, the ELA may be a lower is better (e.g., golf handicap), and thus, the condition may be based on a falling below a threshold as an area of achievement. Different rubrics may be used, such as, a first rubric that is out of 4, a pass/fail rubric, a third rubric out of 100, and a fourth rubric where lower is better. Each of the different rubrics would need passed, according to an embodiment.

Figure 6C:
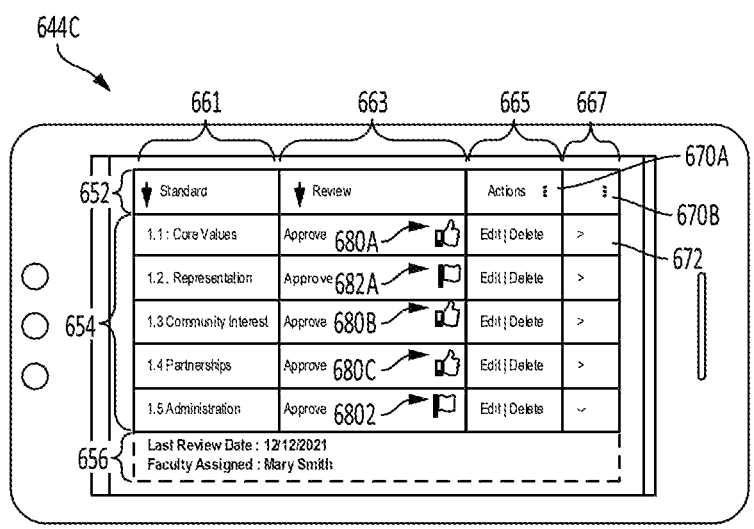
FIG. 6C illustrates a display device displaying a standards status table, according to certain embodiments.

FIG. 6C illustrates a display device displaying a standards status table 644C, according to certain embodiments. As shown in FIG. 6C, the systems and methods described herein may be viewable on any electronic computing device, such as the electronic computing device 150. FIG. 6C shows a smartphone device displaying a limited SPE GUI 644C (FIG. 6C is a mobile version of FIG. 6B). The limited SPE GUI 644C is more mobile-friendly than the full desktop version of the SPE GUI 644A, 644B (in view of the limited screen size of smartphones because there is a desire for smartphones to be able to be carried on/by a person, which limits screen size). The limited SPE GUI 644C may display a limited number of columns 661, 663, 665 and 667 (although different columns may be shown). The rows 654 may also include satisfactory alerts 680A-680C and needs review alerts 682A and 682B. The limited SPE GUI 644C may also include a button 670B that, when interacted with, displays a limited menu including some of the contents of the left menus 522 and 524 of FIG. 5B (that is the left menus 522 and 524 are nested in the mobile version).

According to an embodiment, the mobile version may include displaying columns that matter the most (most useful), and provide a down button 672 that drills down to display one or more of the other columns (the remaining columns that are not a part of the original display on mobile version). According to an embodiment, the most important columns may be displayed and the rest may be hidden. The displayed and hidden columns may be modified by pressing on button 670B.

Standards column 661, review column 663 and actions column 665 may correspond to a standards summary name column 612, a review status column 620, an actions column 622, respectively (as discussed above). The actions column 665, like actions column 622 provides a user interface for the user to edit/delete a Standard.

The column 667 may provide a see more button 672 to view more properties of the row (e.g., in a new display screen or popup with the hidden properties of the row or clickable options to view the hidden properties of the row). According to an embodiment, see more button 572 allows the user to accordion-down to view the fields that are not rendered due to the lower screen size. The fields that are not rendered (hidden) due to the lower screen size may be displayed elsewhere such as in text field 656.

Identifying Program Standards Criteria

The identifying of program standards criteria (Operation 208) may include collecting official standards data that has been manually entered or imported from one or more sources. The initial entry of standards data may be manual using the interface seen on FIG. 5D. The import process may include reimporting the exported data from another program (e.g., a format that is easily manipulated by internal support team, like XLS, or CSV). The raw standards can be exported and reimported (and edited) via an upload/download to Excel. Reports for individual Standards can be uploaded, but are also able to refer to in-system reports. In addition, the standards data may be categorized as corresponding to a particular program, such as an academic or career standard. Operation 206 may include continuously maintaining all standards information, along with all other clinical and lab data.

Program Standards Reports

Figure 7:
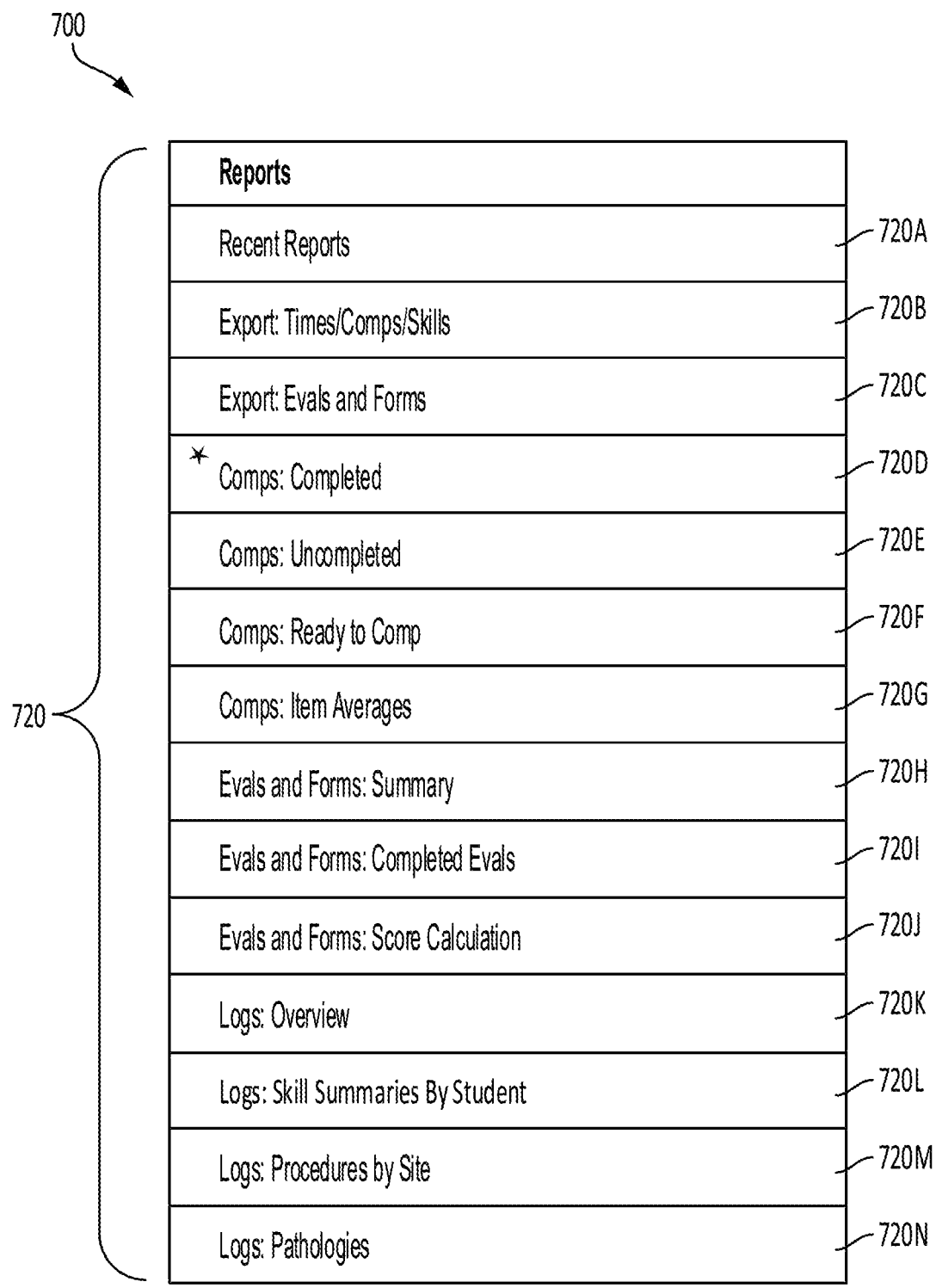
FIG. 7 illustrates a displayable reports sub-menu, according to certain embodiments.

FIG. 7 illustrates a reports sub-menu 700, according to certain embodiments. The reports sub-menu 700 may include buttons that can be interacted with to cause various types of reports 720A-720N to be displayed as sub screens and/or be printed. The reports sub-menu 700 may easily pull data, to provide as evidence for accreditation visits. The reports sub-menu 700 may be a pre-cursor to a download or print function(s) (e.g., xls and pdf reports, optionally also printable in HTML). The server method may include providing a user interface to print the tables (e.g., sub screens), which are printable, as reports). For example, the recent reports button 720A may generate and display a list of recently generated (e.g., last run) reports. The export: times/comps/skills report button 720B may generate and display a report regarding downloadable/viewable attendance, comp/checkoffs, skill log file and/or reports for up to 10 years with drill down search capabilities. The export: evals and forms button 720C may generate and display a report regarding Downloadable and/or viewable evals, surveys, form file reports for up to 10 years with drill down search capabilities. The Comps: Completed button 720D may generate and display a report regarding Competencies & skill checkoffs submitted by authorized preceptors/supervisors/adjunct faculty with search capabilities. The Comps: Uncompleted button 720E may generate and display a report regarding Uncompleted competencies & skill checkoffs by student, skill, and/or study area based on program requirements.

The Comps: Ready to Comp button 720F may generate and display a report regarding Competencies & skill checkoffs that show students who have completed the requirements for them to receive a comp/check offs. The Comps: Item Averages button 720G may generate and display a report regarding Competencies & skill checkoffs that shows overall averages for competencies/skill check-offs.

The Evals and Forms: Summary button 720H may generate and display a report regarding Completed Evaluations report submitted by Students, preceptors/supervisors, adjunct and authorized faculty with search capabilities. The Evals and Forms: Completed Evals button 720I and the Evals and Forms: Score Calculation button 720J may generate and display Completed Evaluations and Score Calculations reports, respectively, submitted by Students, preceptors/supervisors, adjunct and authorized faculty with search capabilities. These Evals and forms are also editable by authorized program staff.

The Logs: Overview button 720K may generate/create and display a report regarding all skill logs received in labs or clinical rotations/externship experiences with drill down capabilities. The Logs: Skill Summaries By Student button 720L may generate and display a report regarding easily finding submitted student (or faculty) completed skill logs showing progress.

The Logs: Procedures by Site 720L may generate and display a report regarding Summary view of completed skill logs (Lab or clinical rotation/externship) completed by each site. Searchable and drill down. The Logs: Pathologies 720M may generate and display a report regarding a Summary view of any additional criteria such as pathology, which is an optional section that is customized and is searchable (can be drilled down).

According to an embodiment, Comps, skill assessment, checkoffs are all interchangeable terms and are performed by authorized instructors/supervisors/preceptors/adjunct faculty/faculty authorized by the programs in the database.

FIG. 8 illustrates a trends sub screen 800, according to certain embodiments. The trends sub screen 800 may include a trend line or dashboard. The trend line on FIG. 8 is an example of how a report on the systematic plan may be displayed (e.g., in response to a report button of FIG. 7 being interacted with). This allows the user to view a quantitative standard, percent success, or similar.

Figure 9:
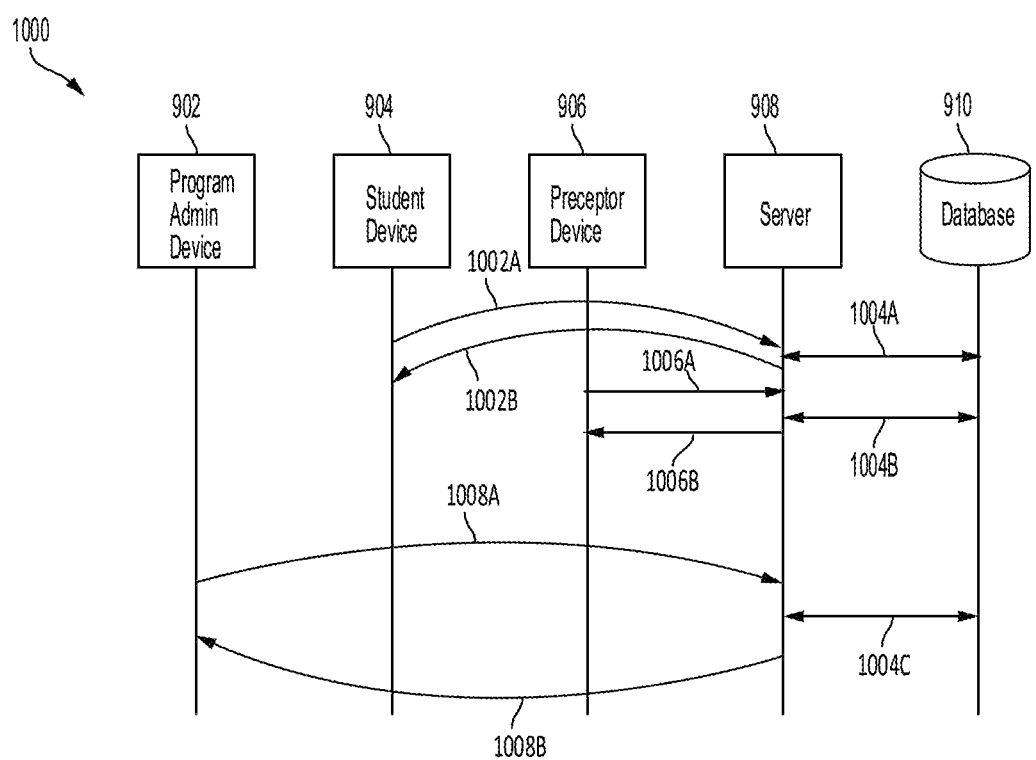
FIG. 9 illustrates a diagram of network requests, according to certain embodiments.

FIG. 9 illustrates a diagram of network requests, according to certain embodiments. The network request may include the network transmissions as described above. Specifically, the communications between the responsive server and the various devices may include network communications as shown in FIG. 9. For example, Operation 1002 may include a student requesting a webpage (i.e., the student device 904 sending a webpage request to sever 908 over the network), and, in response to receiving that request, the server 904 may perform communication with the database, and transmit the web page information (or GUI application control information) to the student device 904 to cause the student device 904 to display the student GUI application. In a similar respect, the Preceptor (Supervisor) Device may request a webpage from the server 908 (Operation 1006A), which causes the server 908 (Operation 1004B) to communicate with the database, and transmit the webpage information (or GUI application control information) to the preceptor device 906 to cause the preceptor device to provide a display application that includes the supervisor GUIs. The Program Admin Device 902 may request a webpage or to log in to an application corresponding to the Program Standards GUI (Operation 1016), which causes the server 908 to communicate with the database 910, and provide the program standards GUI experience to the Program Admin Device 902.

The database communication may include the server reading/writing from/to database in response to request and/or updates (e.g., via student time records submitted, via student skills records approved, via edits via the edit details screen). The database may also have scheduled tasks that are run by the server on the database.

Each of the operations of FIG. 9 may be performed in various different orders and/or simultaneously and continuously to provide real time updates. The network requests may include multiple requests/responses and the communications may include more than repetitive GUI requests (e.g., the computing devices may transfer information back and forth to the server, which uses the database as storage, including multiple real time database transactions). According to an embodiment, time is a variable on the vertical, but the network requests/responses may be performed repeatedly and in differing temporal orders.

According to an embodiment, each of the users may have the same types of network patterns. The database may be local to the server or be external to the server (e.g., a third-party server cloud platform). The network requests may be direct or indirect requests (e.g., requests that travel through another server system, such as a web host server system).

Overlapping elements are not repeated and may correspond to previously described elements having a same or similar name (e.g., a new instance of a GUI button may correspond to the previous description of the same button). While explaining the GUIs according to embodiments of the disclosure, a detailed description of the contents overlapping with the GUIs according to the embodiments will be omitted.

According to various embodiment, the methods and system provide functions of displaying GUIs that provide various functionalities related to accreditation of professional career program modalities that require activities outside of the classroom (e.g., hospital shifts, clinical labs, engineering internships). The GUIs including: (i) a first GUI for receiving user input related to a program modality (e.g., to update/add to/import a list of program modalities associated with an institution/school program), and (ii) a second GUI screen to receive/import data related to the standards for compliance of a program modality associated with the institution/school. The second GUI screen may be a template GUI used for receiving standards compliance information for each program modality associated with a logged-in institution/school user.

The second GUI screen may include: (i) a toggle field for toggling the standard as quantitative or qualitative, (ii) entry field(s) for designating a numerical value or percentage corresponding to the expected level of achievement (ELA) for each quantitative standard, (iii) entry fields for deadline (e.g., accreditation review due deadline) and (iv) deadline alert information (e.g., email addresses to be alerted/notified and time buffer (e.g., remind within 10 days of deadline)).

The second GUI screen may also provide real-time scoring and feedback information by, for example, comparing the ELA with real data (e.g., attendance adherence based on attendance in clinicals/labs of a set of students associated with the institution's program, which may be based on evaluation of a set of student self-reported timekeeping (clock-in, clock-out) information verified by a preceptor/faculty. The clock-in, clock-out functionality may use geofencing/GPS. As another example, exam grades/test scores may be used as real data. The scoring and feedback information may be customizable based on time ranges (e.g., last 5 years, last 10 years, custom time range) and other user input (e.g., customized to each unique program, standard (e.g., based on program and standard identifiers). The second GUI may display the Summary (or Accredited Standard name), the qualitative standards corresponding to the modality/accrediting agency mapped to the institution input qualitative standards) and outcome (e.g., after a Student, instructor, faculty member adds text feedback on a particular accreditation item identified by the program and standard (e.g., a qualitative item), the system may provide a report (e.g., a third GUI screen that is printable/exportable) with individual or consolidated feedback indicating a status (e.g., the item/standard has been met (green), needs improvement (warning/yellow) or in trouble (warning/red)). The feedback information may include different imagery/text based on whether the ELA or accreditation item has been met or not.

The set of students (and corresponding timekeeping information) may be selected based on association in a database with the institution and/or the program (e.g., all students associated with the institution's program and associated timekeeping information during periods of enrollment). The standards may be accreditation standards, such as higher ed accreditation standards (or the individual modalities), including nursing or engineering program accreditation standards.

The second GUI may include a report generation button that generates and displays/exports a report mapping institution data to a particular modality from the database (e.g., mapping the attendance adherence to a quantitative standard over a user-defined time range, or mapping the results of course exams to a particular ELA of a standard for accreditation).

Each quantitative item may have numeric values (e.g., based on user input). These values will be used in the report to map back to the individual item or standards to be tracked. The mapping is how the standards (all items to meet that standard) are identified and reported on as one standard or item to be monitored and tracked.

According to an embodiment, a networked server system may comprise: a first electronic display device configured to cause a processor of the first electronic display device to control a first display to display a first set of user interface (UI) screens, wherein the first set of UI screens are configured to verify the identity of a student and receive information from the student related to an accredited program; a second electronic display device configured to cause a processor of the second electronic display device to control a second display to display a second set of UI screens, wherein the second set of UI screens are configured to simultaneously display the information received from the student related to the accredited program, and a prompt that prompts the user of the second electronic display device to confirm or sign for the information received from the student related to the accredited program, and wherein the second set of UI screens includes a data entry field for the user of the second electronic display device to confirm or sign for the information received from the student related to the accredited program, and wherein the second electronic display device is configured to transmit information that has been confirmed or signed for to the server as faculty-verified student information; a third electronic display device configured to cause a processor of the third electronic display device to: map the faculty-verified student information to a standard of the program; calculate a score based on comparing the faculty-verified student information with the standard of the program; and control a third display to display the calculated score or a report based on the calculated score; and a server that is configured to facilitate communications between the first electronic display device, the second electronic display device and the third electronic display device.

According to an embodiment, the SPE is more program focused than school focused. Each program may have its own home screen. According to an embodiment, affiliated agreements is the basis of the feature, such that users with affiliated agreements may have their own GUI.

According to an embodiment, the database access is for the individual program but it could be for a Dean of an institution that has oversight into multiple programs, and is able to toggle between respiratory therapy to radiography, to nursing, etc., but the individual program director who leads the program will have program access if there is a leader that has a requirement that oversee multiple programs either within a single modality (e.g., imaging sciences) where you may have two separate programs where they run separately, but the same program leader will oversee both of them within imaging sciences. If it is a Dean of the Allied Health School or the Dean of the Health Sciences school, somebody who will have supervised oversight for multiple modalities, they will also be able to use this to toggle between multiple modalities at the institution level. Programs level are at a higher level than one person who may have a limited role. Some SPE users may have oversight over one program and other SPE users may have oversight into multiple programs and/or modalities. For example, drop-down menus 542A and 542B of FIG. 5C may be used to modify the program and/or any grouping. According to an embodiment, a test program may be provided for institutional testing purposes.

Organizations have people spend significant amounts of time to prove that they are passing each one of the standards because any failure whatsoever can make them probationary and/or lose accreditation. According to an embodiment, supervisors validate data that is required by accreditors. Data in the database may come from faculty and administrative staff that is also required by accreditors. All of the different user data may be combined to answer specific items that the boards in the accreditation standards require that the programs track, measure and show outcomes. If the outcome is a failing outcome, the institution must show improvement. For example, show progress from failure point (e.g., show halfway through 3-year period the score was a 6 but was supposed to get a 7, so implemented new strategy and went from a 6 to a 6.5 (showing evidence of improvement even if did not hit target). According to an embodiment, failure with regards to an individual program standard item may be dynamically identified in real time and reported for corrective action.

According to an embodiment, the system streamlines the ability to prove success/failure and/or progress to the accreditors and the ability to track and measure the success/failure and/or progress on a daily basis and be able to get that result in real time (with a click of a button) without having to wait. For example, the proof of progress may include proof of past failure and proof of evidence to correct. The proof information (and the GUIs discussed above) may be printable, exportable (e.g., saved in Word or Excel format). According to an embodiment, the system provides a multi-user, multi-portal, real time accreditation scoring and compliance reporting of faculty verified student data. Each user account may have a different portal. The system may include real time accreditation scoring and compliance reporting of faculty verified student data. Different user types may each have a different portal (e.g., different GUI experiences on the basis of user type).

According to an embodiment, the system could be used for another internal systematic plan that is not focused on individual standards. The term standard may not be universal and other metrics may be used instead of a standard, such as student satisfaction, internally discussed company growth goals, key performance indicators (KPIs) for a purpose, program review, internal quality guidelines/standards, best practices, and/or requirements. According to an embodiment, the clinical outcomes are for accreditation and compliance standards.

According to an embodiment, the GUIs are populated with data from the database. For example, when the user navigates to a GUI, that GUI will show the current data sets.

According to an embodiment, the individual modules will track specific requirements. Whether it be a 1-year, 3-year, 5-year, 10-year tracking of an individual item within an individual form that is going to prove the institution is meeting or exceed an individual standard that the accrediting agency is reviewing. The examples of the data in the database include an evaluation that was submitted by a student and/or a skill that was authorized or authenticated by an instructor. The related art does not disclose looking at the database for the individual program so the data can be tracked, measured and reported on in view of the individual program standards.

According to an embodiment, the modalities may include pre-canned or pre-populated standards, and/or standards that are created and/or customized by a user. According to an embodiment, the standards file may be transmissible to the accrediting agencies database. For example, a standards file may be created that has all of the standards for every program, and a button may be provided in a GUI that, when clicked, causes the standards file to be transferred into their accreditation management system (e.g., imported into their system from the standards file, such as by automatic upload). The standards file may include everything the accreditor needs, according to an embodiment.

According to an embodiment, a networked server system method may include: responsive to receiving user input: automatically identifying a unique program identifier associated with a unique school identifier; accessing a database to identify: (i) each of a plurality of unique student identifiers associated with the unique program identifier and the unique school identifier, and student-entered time entry logs respectively associated with the plurality of unique student identifiers; calculating an attendance adherence score based on the identified student-entered time entries; calculating a program score based at least in part on the calculated attendance adherence score; and displaying or outputting the calculated program score or an accreditation report based on the calculated program score.

Although exemplary embodiments have been shown and described, the disclosure is not limited thereto, and various modifications and variations are possible within the scope of the appended drawings and the detailed description. For example, embodiments or elements of various embodiments, can be applied not only to display methods and systems for accreditation programs, but also to other career modalities having standards, each of which falls within the scope of the present invention. It will be appreciated by those skilled in the art that changes may be made in these exemplary embodiments without departing from the principles and spirit of the general inventive concept, the scope of which is defined in the appended claims and their equivalents.

The invention claimed is:

1. A real time server system method performed by one or more hardware servers, the real time server system method comprising:

controlling a display of or coupled to an electronic computing device to display a program standards graphical user interface (GUI) that includes a populated list of individual standards criterion required by a higher education program wherein the individual standards criterion in the populated list includes a first higher education standards criterion and a second higher education standards criterion, the first higher education standards criterion being different than the second higher education standards criterion;

detecting a user interaction with an individual item in the populated list of individual standards criterion required by the higher education program;

based on the detecting of the user interaction with the individual item in the populated list of individual standards criterion required by the higher education program, causing the display to display an edit details sub screen corresponding to a single individual standards criterion associated with the individual item in the list, wherein the edit details sub screen displays accreditable program criteria required by a respective higher education accreditation agency including at least three customizable user input fields, the at least three customizable user input fields including first customizable user input field configured to receive a user input of a text summary of the single individual standards criterion, a second customizable user input field configured to receive a user input of an indication of being a quantitative standard or a qualitative standard and a third customizable user input field configured to receive a user input of an indication of an expected level of achievement (ELA); and while the edit details sub screen is being displayed, and when a user save interaction with the edit details sub screen is detected, receiving, over a network by a server, any new user input entered into the first customizable user input field, the second customizable user input field, and/or the third customizable user input field, and updating or adding, by the server, to a database, at least one of: (i) a text summary of the single individual standards criterion based on user input having been entered into the first customizable user input field, (ii) an indication of being a quantitative standard or a qualitative standard based on user input having been entered into the second customizable user input field, or (iii) an indication of the ELA bawsed on user input having been entered into the third customizable user input field.

2. The real time server system method of claim 1, further comprising:

tracking, and logging in the database, student timekeeping activity;

causing a portion of the tracked student timekeeping activity to be displayed by a supervisor electronic device; and tracking, and logging in the database, relevant supervisor verification activity related to a supervising role in the higher education program, the relevant supervisor verification activity including a user interaction with the displayed portion of the tracked student timekeeping activity.

3. The real time server system method of claim 2, wherein the tracking and logging of the student timekeeping activity includes a clock-in/clock-out functionality including a GUI configured to self-record contemporaneous student timekeeping activity.

4. The real time server system method of claim 3, wherein the displayed program standards GUI is a real time nested GUI that is automatically updated in real time, and that includes a nested architecture with a static region and a dynamic region, wherein the static region is displayed persistently, and the dynamic region changes based on user interactions with the static region, and the static region includes a program standards menu with buttons that cause the dynamic region to change display screens when the buttons are interacted with.

5. The real time server system a method of claim 4, further comprising:

detecting an anomaly with the student timekeeping activity, and based on detecting the anomaly with the student timekeeping activity, controlling the dynamic region to display a warning or alert when an anomaly with student timekeeping activity has been detected.

6. The real time server system method of claim 1, wherein the second customizable user input field includes a quantitative/qualitative toggle field that toggles, based on user input, between an indication of being a quantitative criterion and an indication of being a qualitative criterion.

7. The real time server system method of claim 1, further comprising:

in response to the new user input being entered into the first customizable user input field, the second customizable user input field, and/or the third customizable user input field, causing the new user input to be displayed, wherein the updating or adding, by the server, to the database includes maintaining a centralized database by updating compliance data in the centralized database with the new user input.

8. The real time server system method of claim 1, further comprising:

in response to a user interaction corresponding to a report generation request, generating, based on data stored in the database, a report on standards of the higher education program and stored student activity of students enrolled in the higher; education program and associated with a logged-in user and/or organization, and displaying or exporting the generated report information to maintain compliance with the standards of the program.

9. The real time server system method of claim 8, wherein the generated report information includes or is based on supervisor verified student activity, including time-dependent skill records.

10. A responsive server system comprising:

a memory; and processing circuitry, wherein the processing circuitry is configured to execute computer-executable instructions stored in the memory, which when executed by the processing circuitry, perform the following operations:

controlling a display of or coupled to an electronic computing device to display a program standards graphical user interface (GUI) that includes a populated list of individual standards criterion required by a higher education program, wherein the individual standards criterion in the populated list includes a first higher education standards criterion and a second higher education standards criterion, the first higher education standards criterion being different that the second higher education standards criterion;

detecting a user interaction with an individual item in the populated list of individual standards criterion required by the higher education program;

based on the detecting of the user interaction with the individual item in the populated list of individual standards criterion required by the individual program, causing the display to display an edit details sub screen corresponding to a single individual standards criterion associated with the individual item in the list, wherein the edit details sub screen displays accreditable program criteria required by a respective higher education accreditation agency including at least three customizable user input fields, the at least three customizable user input fields including first customizable user input field configured to receive a user input of a text summary of the single individual standards criterion, a second customizable user input field configured to receive a user input of an indication of being a quantitative standard or a qualitative standard and a third customizable user input field configured to receive a user input of an indication of an expected level of achievement (ELA); and while the edit details sub screen is being displayed, and when a user save interaction with the edit details sub screen is detected, receiving, over a network by the processing circuitry, any new user input entered into the first customizable user input field, the second customizable user input field, and/or the third customizable user input, and updating or adding, by the server, to a database, at least one of: (i) a text summary of the single individual standards criterion based on user input having been entered into the first customizable user input field, (ii) an indication of being a quantitative standard or a qualitative standard based on user input having been entered into the second customizable user input field, or (iii) an indication of the ELA based on user input having been entered into the third customizable user input field.

11. The real time server system of claim 10, further comprising computer-executable instructions stored in the memory, which when executed by the processing circuitry perform the following operations: comprising:
tracking, and logging in the database, student timekeeping activity;
causing a portion of the tracked student timekeeping activity to be displayed by a supervisor electronic device; and
tracking, and logging in the database, relevant supervisor verification activity related to a supervising role in the higher education program, the relevant supervisor verification activity including a user interaction with the displayed portion of the tracked student timekeeping activity.

12. The real time server system of claim 10, wherein the tracking and logging of the student timekeeping activity includes clock-in/clock-out functionality including a GUI configured to prompt a student to self-record contemporaneous student timekeeping activity.

13. The real time server system of claim 12, wherein the displayed program standards GUI is a real time nested GUI that is automatically updated in real time, and that includes a nested architecture with a static region and a dynamic region, wherein the static region is displayed persistently, and the dynamic region changes based on user interactions with the static region.

14. The real time server system of claim 13, wherein the static region includes a program standards menu with buttons that cause the dynamic region to change display screens when the buttons are interacted with.

15. The real time server system of claim 10, wherein the second customizable user input field includes a quantitative/qualitative toggle field that toggles based on user input, between an indication of being a quantitative criterion and n indication of being a qualitative criterion.

16. The real time server system of claim 10, further comprising: in response to the new user input being entered into the first customizable user input field, the second customizable user input field, and/or the third customizable user input field, causing the new user input to be displayed in the user input field that it was entered into, from among the first customizable user input field, the second customizable user input field, and the second customizable user input field, and the updating or adding, by the server, to the database includes maintaining a centralized database by updating compliance data in the centralized database with the new user input.

17. The real time server system of claim 10, further comprising:
identifying a time exception in a portion of the student timekeeping activity, and displaying information related to the identified time exception.

18. A non-transitory computer-readable medium comprising computer-executable instructions that, when executed by processing circuitry, cause the processing circuitry to perform the following operations:
controlling a display of or coupled to an electronic computing device to display a program standards graphical user interface (GUI) that includes a populated list of individual standards criterion required by a higher education program, the individual standards criterion in the populated list includes a first higher education standards criterion and a second higher education standards criterion, the first higher education standards criterion being different than the second higher education standards criterion;
detecting a user interaction with an individual item in the populated list of individual standards criterion required by the higher education program;
based on the detecting of the user interaction with the individual item in the list of individual standards criterion required by the higher education program, causing the display to display an edit details sub screen corresponding to a single individual standards criterion associated with the individual item in the list, wherein the edit details sub screen displays accreditable program criteria required by a respective higher education accreditation agency at least three customizable user input fields, the at least three customizable user input fields including first customizable user input field configured to receive a user input of a text summary of the single individual standards criterion, a second customizable user input field configured to receive a user input of an indication of being a quantitative standard or a qualitative standard and a third customizable user input field configured to receive a user input of an indication of an expected level of achievement (ELA); and
while the edit details sub screen is being displayed, and when a user save interaction with the edit details sub screen is detected, receiving over a network by the processing circuitry, any new user input entered into the first customizable user input field, the second customizable user input field, and/or the third customizable user input field, and updating or adding, by the server, to a database, at least one of: (i) a text summary of the single individual standards criterion based on user input having been entered into the first customizable user input field, (ii) an indication of being a quantitative standard or a qualitative standard based on user input having been entered into the second customizable user input field, or (iii) an indication of the ELA based on user input having been entered into the third customizable user input field.

19. The non-transitory computer-readable medium of claim 18, further comprising:
tracking, and logging in the database, student timekeeping activity related to enrollment in the higher education program;

causing a portion of the tracked student timekeeping activity to be displayed by a supervisor electronic device; and tracking, and logging in the database, relevant supervisor verification activity related to a supervising role in the higher education program, the relevant supervisor verification activity including a user interaction with the displayed portion of the tracked student timekeeping activity.

20. The non-transitory computer-readable medium of claim 19, wherein the tracking and logging of the student timekeeping activity includes clock-in/clock-out functionality including a GUI configured to self-record contemporaneous student timekeeping activity.

\* \* \* \* \*